United States Patent
Demirtas et al.

(10) Patent No.: US 10,627,494 B2
(45) Date of Patent: Apr. 21, 2020

(54) INTERFERENCE HANDLING IN TIME-OF-FLIGHT DEPTH SENSING

(71) Applicant: Analog Devices, Inc., Norwood, MA (US)

(72) Inventors: Sefa Demirtas, Malden, MA (US); Tao Yu, Cambridge, MA (US); Atulya Yellepeddi, North Reading, MA (US); Nicolas Le Dortz, Cambridge, MA (US)

(73) Assignee: Analog Devices, Inc., Norwood, MA (US)

( * ) Notice: Subject to any disclaimer, the term of this patent is extended or adjusted under 35 U.S.C. 154(b) by 97 days.

(21) Appl. No.: 15/705,095

(22) Filed: Sep. 14, 2017

(65) Prior Publication Data

US 2018/0081043 A1    Mar. 22, 2018

Related U.S. Application Data

(60) Provisional application No. 62/431,395, filed on Dec. 7, 2016, provisional application No. 62/396,038, filed on Sep. 16, 2016.

(51) Int. Cl.
*G01S 7/486*   (2020.01)
*H04N 5/247*   (2006.01)
(Continued)

(52) U.S. Cl.
CPC ............ *G01S 7/4868* (2013.01); *G01S 7/487* (2013.01); *G01S 7/4816* (2013.01);
(Continued)

(58) Field of Classification Search
CPC ........ G01S 17/89; G01S 17/107; G01S 17/10; G01S 17/08; G01S 7/4808; G01S 7/4868; G01S 7/4816; G01S 7/4865; G01S 7/487; H04N 5/247; H04N 5/33; H04N 5/2352; H04N 5/332; H04N 13/254; H04N 13/271; H04N 13/282
See application file for complete search history.

(56) References Cited

U.S. PATENT DOCUMENTS 4,708,473 A  *  11/1987  Metzdorff ............... G01S 17/89
                                                        356/5.04
6,219,596 B1 *   4/2001  Fukae ..................... G01S 17/74
                                                         180/169
(Continued)

OTHER PUBLICATIONS

International Search Report and Written Opinion issued in International Patent Application Serial No. PCT/US2017/051820 dated Dec. 20, 2017, 13 pages.
(Continued)

*Primary Examiner* — David E Harvey
(74) *Attorney, Agent, or Firm* — Patent Capital Group

(57) ABSTRACT

Aspects of the embodiments are directed to methods and imaging systems. The imaging systems can be configured to sense, by an light sensor of the imaging system, light received during a time period, process the light received by the light sensor, identify an available measurement period for the imaging system within the time period based on the processed light, and transmit and receive light during a corresponding measurement period in one or more subsequent time periods.

32 Claims, 30 Drawing Sheets

(51) Int. Cl.
| | |
|---|---|
| *H04N 5/33* | (2006.01) |
| *G01S 17/89* | (2020.01) |
| *G01S 17/10* | (2020.01) |
| *H04N 5/235* | (2006.01) |
| *H04N 5/232* | (2006.01) |
| *H04N 5/225* | (2006.01) |
| *H04N 13/254* | (2018.01) |
| *H04N 13/271* | (2018.01) |
| *H04N 13/282* | (2018.01) |
| *G01S 7/481* | (2006.01) |
| *G01S 7/4865* | (2020.01) |
| *G01S 7/487* | (2006.01) |

(52) U.S. Cl.
CPC ............ *G01S 7/4865* (2013.01); *G01S 17/10* (2013.01); *G01S 17/89* (2013.01); *H04N 5/2256* (2013.01); *H04N 5/232* (2013.01); *H04N 5/2352* (2013.01); *H04N 5/247* (2013.01); *H04N 5/33* (2013.01); *H04N 5/332* (2013.01); *H04N 13/254* (2018.05); *H04N 13/271* (2018.05); *H04N 13/282* (2018.05); *H04N 5/2353* (2013.01); *H04N 5/2354* (2013.01)

(56) References Cited

U.S. PATENT DOCUMENTS

| | | | | |
|---|---|---|---|---|
| 7,405,812 | B1* | 7/2008 | Bamji | G01S 13/325 356/5.1 |
| 9,247,238 | B2* | 1/2016 | Izadi | H04N 5/332 |
| 10,313,655 | B2* | 6/2019 | Nakamura | H04N 13/167 |
| 10,419,703 | B2* | 9/2019 | Goma | G03B 35/00 |
| 2002/0113882 | A1 | 8/2002 | Pollard et al. | |
| 2012/0069176 | A1* | 3/2012 | Park | G01S 17/89 348/135 |
| 2012/0098964 | A1* | 4/2012 | Oggier | G01S 17/89 348/140 |
| 2013/0242058 | A1* | 9/2013 | Bae | G01S 17/107 348/47 |
| 2014/0313375 | A1 | 10/2014 | Mlinar | |
| 2015/0304534 | A1* | 10/2015 | Kadambi | H04N 5/2256 348/207.11 |
| 2015/0312554 | A1 | 10/2015 | Banks et al. | |
| 2015/0331092 | A1 | 11/2015 | Galera et al. | |
| 2015/0338510 | A1 | 11/2015 | Pandharipande et al. | |
| 2015/0355330 | A1* | 12/2015 | Oberhammer | G01S 17/36 356/5.01 |
| 2015/0373322 | A1* | 12/2015 | Goma | G03B 17/38 348/21 |
| 2016/0073041 | A1* | 3/2016 | Daalderop | G01S 17/89 348/370 |
| 2016/0109575 | A1* | 4/2016 | Oggier | G01S 17/89 356/5.01 |
| 2016/0139265 | A1* | 5/2016 | Yahav | G01S 17/06 356/51 |
| 2016/0182820 | A1 | 5/2016 | Borthakur et al. | |
| 2016/0349359 | A1* | 12/2016 | Nevet | G01S 7/4865 |
| 2017/0074976 | A1 | 3/2017 | Takahashi et al. | |
| 2017/0094248 | A1* | 3/2017 | Kashyap | H04N 13/211 |
| 2017/0188019 | A1* | 6/2017 | Kashyap | H04N 5/23206 |
| 2017/0272731 | A1* | 9/2017 | Kashyap | H04N 5/2256 |
| 2018/0081032 | A1* | 3/2018 | Torruellas | G01S 17/10 |
| 2018/0205963 | A1* | 7/2018 | Matei | H04N 19/46 |
| 2018/0262740 | A1* | 9/2018 | Ross | G06K 9/00604 |
| 2019/0162824 | A1* | 5/2019 | Amaya-Benitez | G01S 7/4804 |

OTHER PUBLICATIONS

1st Action Notice of Allowance issued in U.S. Appl. No. 15/705,141 dated Jun. 5, 2019.

* cited by examiner

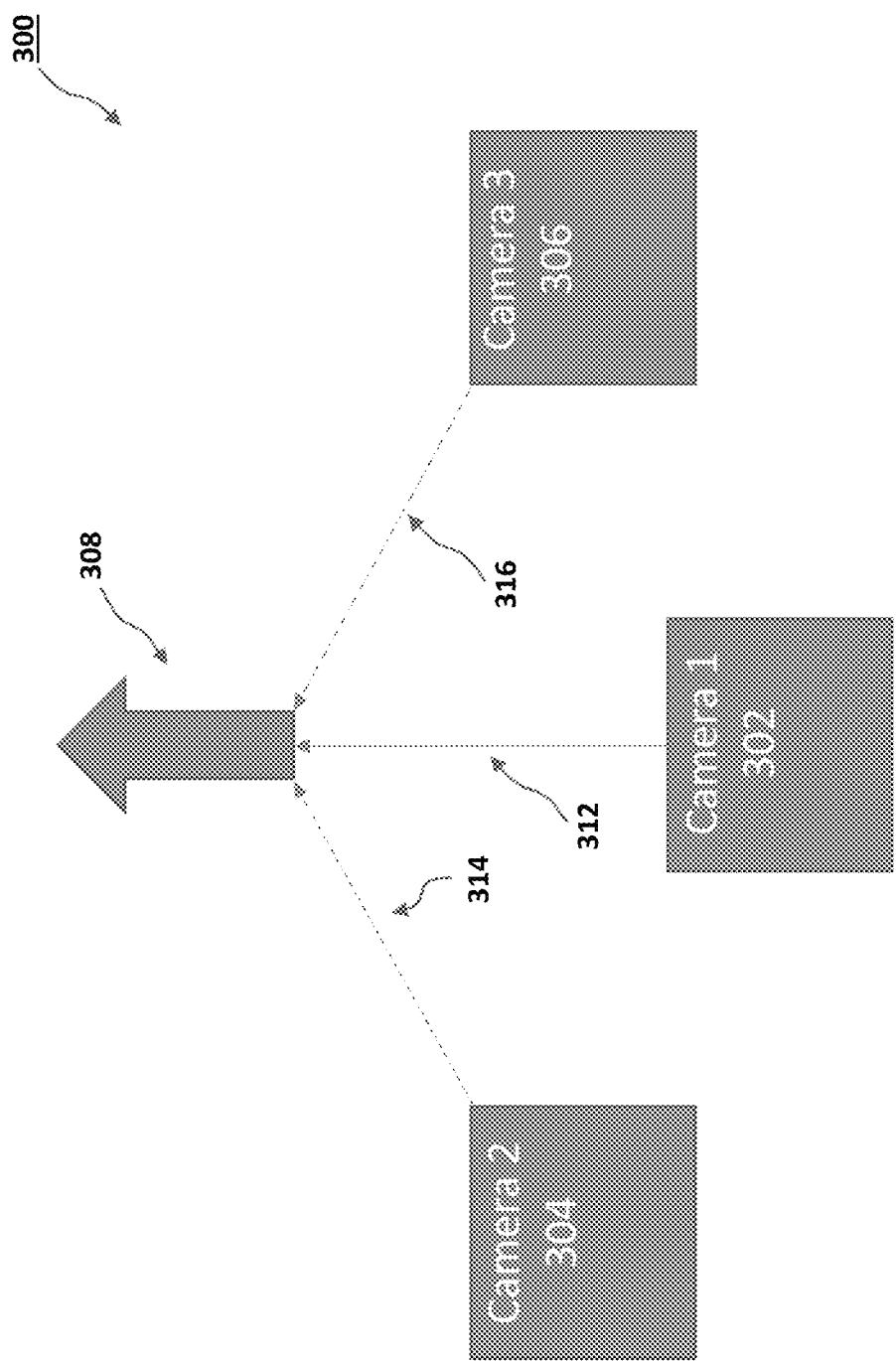

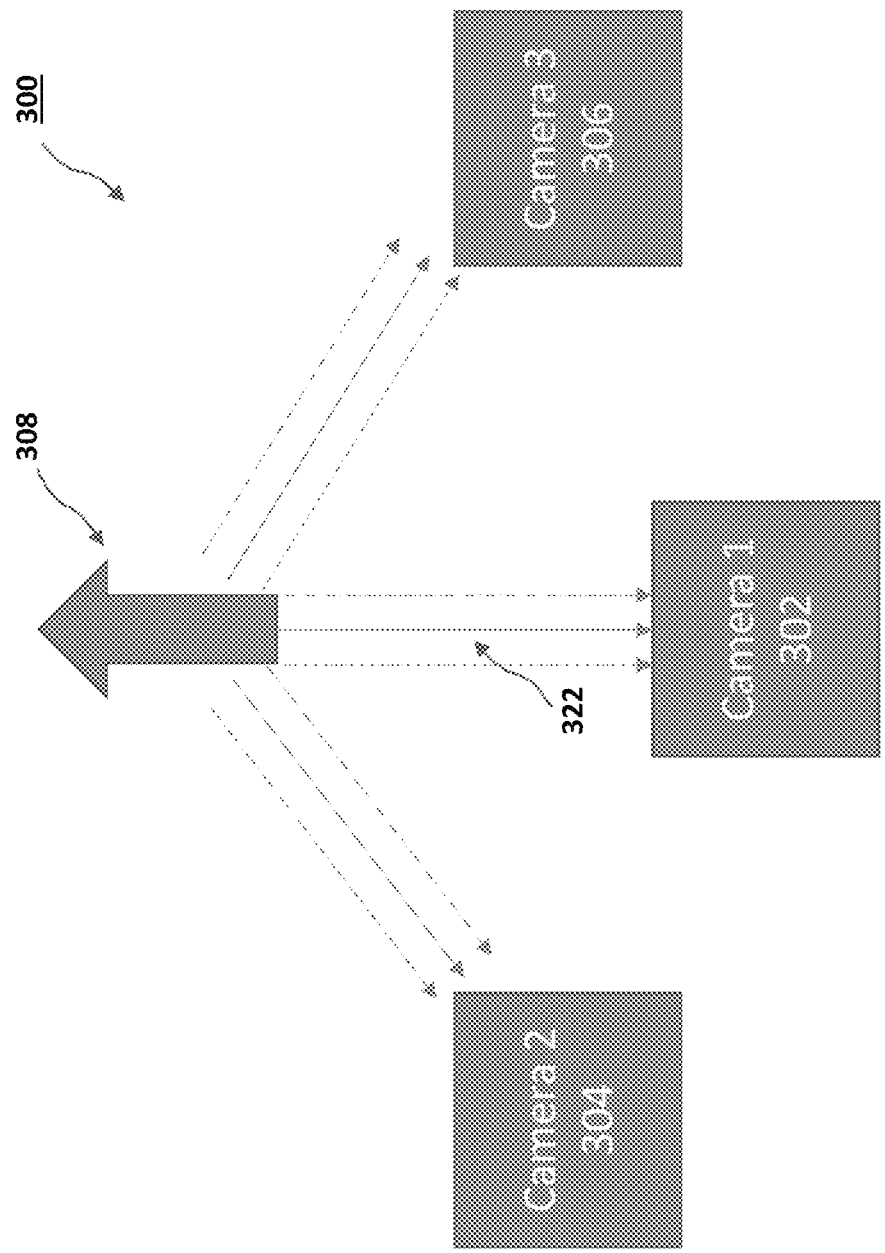

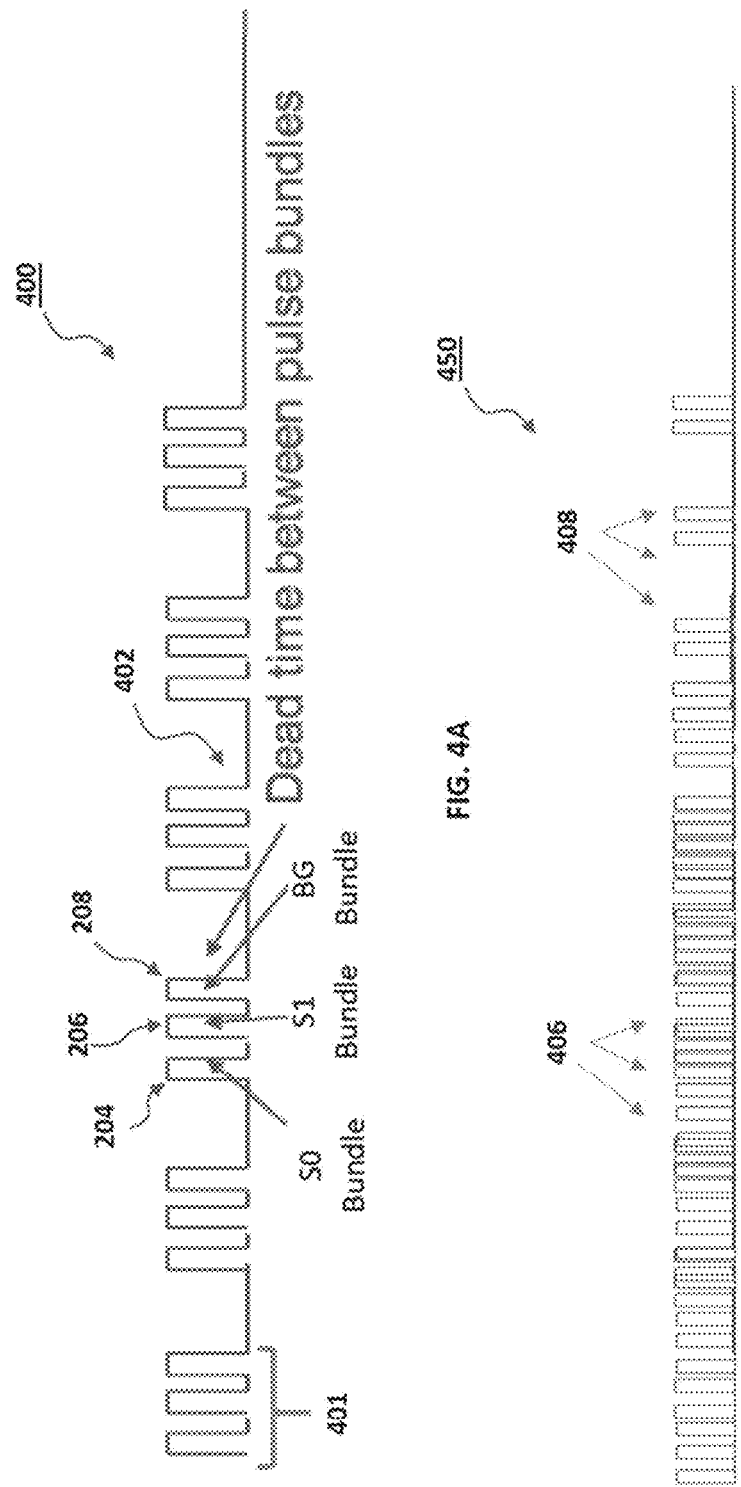

500

```
┌─────────────────────────────────────┐
│ Opening an image sensor shutter for a│
│ predetermined period of time to collect│ — 502
│ light at several time instances      │
└─────────────────────────────────────┘
                    ↓
┌─────────────────────────────────────┐
│ Measuring the received light collected at│ — 504
│ each such time instance              │
└─────────────────────────────────────┘
                    ↓
┌─────────────────────────────────────┐
│ Identifying a grouping of measurements│ — 506
│ that have the same or similar values │
└─────────────────────────────────────┘
                    ↓
┌─────────────────────────────────────┐
│ Identifying a measurement that has a │ — 508
│ different value than an adjacent grouping│
└─────────────────────────────────────┘
                    ↓
┌─────────────────────────────────────┐
│ Opening the image sensor shutter for a│
│ predetermined period of time at time │
│ instances that coincide with and time│ — 510
│ instances that are adjacent to the   │
│ measurement that has a different value│
└─────────────────────────────────────┘
                    ↓
┌─────────────────────────────────────┐
│ Determining the time period that is  │ — 512
│ available for emitting light pulses  │
└─────────────────────────────────────┘
                    ↓
┌─────────────────────────────────────┐
│ Emitting light pulses during the available│ — 514
│ time period                          │
└─────────────────────────────────────┘
```

FIG. 5A

Flowchart for dynamic time-interleaving using photodiode signal

Value of S0 at pixel $i,j$:

$$S0_k[i,j] = \int_0^{d_k T_p} (g_{k,m} R_{i,j}(f_k(t - \Delta t_{k,m}(i,j)) + b_k(i,j))) s_k^*(t) dt + \sum_{m \neq k} \int_0^{d_k T_p} (g_{k,m} R_{i,j}(f_k(t - \Delta t_{k,m}(i,j)) + b_k(i,j))) s_k^*(t) dt$$

⎵ Desired return light from camera k ⎵ Interference from other cameras + background light

Value of $\overline{S0}$ at pixel $i,j$:

$$\overline{S0}_k[i,j] = \sum_{m \neq k} \int_0^{d_k T_p} (g_{k,m} R_{i,j}(f_k(t - \Delta t_{k,m}(i,j)) + b_k(i,j))) s_k^*(t) dt$$

⎵ Interference from other cameras + background light

Interference terms are approx. equal because source signals are random sequences

Estimated S0 at pixel $i,j$: $\widetilde{S0}_k[i,j] = S0_k[i,j] - \overline{S0}_k[i,j]$ but cannot capture $S0_k[i,j]$ & $\overline{S0}_k[i,j]$ in the same frame → instead capture $S0_k[i,j]$ on even rows of pixels and $\overline{S0}_k[i,j]$ on odd rows of pixels

FIG. 9A

- $T_s$: open-shutter duration
- $T_l$: laser-on duration
- $T_p$: pattern duration
- $T_{seq}^{-1}$: time between S0/S0 and S1/S1 sequence
- $p(t)$: shutter and laser shape (typ. rectangular $p(t) = \text{rect}(\frac{t}{T_s} - \frac{1}{2})$
- S0 illumination sequence: $i_k^0(t) = A_{k,0} \sum_{n=0}^{N_p-1} r_k^0[n] p\left(\frac{t - nT_p}{T_l}\right)$
- S1 illumination sequence: $i_k^1(t) = A_{k,0} \sum_{n=0}^{N_p-1} r_k^1[n] p\left(\frac{t - nT_p}{T_l}\right)$
- S0 & S1 illumination sequence: $i_k^0(t) = 0$ & $i_k^1(t) = 0$
- S0 shutter sequence: $s_k^0(t) = \sum_{n=0}^{N_p-1} r_k^0[n] p\left(\frac{t - nT_p}{T_s}\right)$
- S1 shutter sequence: $s_k^1(t) = \sum_{n=0}^{N_p-1} r_k^1[n] p\left(\frac{t - nT_p}{T_s}\right)$
- S0 shutter sequence: $s_k^0(t) = \sum_{n=0}^{N_p-1} r_k^0[n] p\left(\frac{t - nT_p - T_{seq}}{T_s}\right)$
- S1 shutter sequence: $s_k^1(t) = \sum_{n=0}^{N_p-1} r_k^1[n] p\left(\frac{t - nT_p - T_{seq}}{T_s}\right)$

- $N_p$: number of patterns in one sequence
- $k$: camera index
- $l$: interfering camera index
- $i, j$: pixel indexes
- $r_k^0[n] / r_k^0[n]$: random sequence for S0/S0
- $r_k^1[n] / r_k^1[n]$: random sequence for S1/S1
- $\Delta t_{k,l}[i,j]$: delay at camera $k$ of interfering laser from camera $l$ at pixel $i,j$
- $b_k[i,j]$: background light seen by pixel $i, j$ of camera $k$
- $a_{k,l}[i,j]$: attenuation of light coming from camera $l$ at pixel $i, j$ of camera $k$
- $\Sigma_k$: set of cameras interfering with camera $k$

FIG. 9B

Example: estimated final S0 and S1 at pixel 0,0:

$$S0_k[0,0] = \frac{1}{2}(S0_k[0,0] + S0_k[0,1] - S0_k[1,0] - S0_k[1,1])$$

$$S1_k[0,0] = \frac{1}{2}(S1_k[0,0] + S1_k[0,1] - S1_k[1,0] - S1_k[1,1])$$

$$depth[0,0] = \frac{cT_s}{2} \frac{S1_k[0,0]}{S0_k[0,0]}$$

```
┌─────────────────────────────────────────┐
│ Determining a final pixel value for each of a │
│ first set of pixels based on a first random   │     1302
│ timing sequence (S0^)                          │
└─────────────────────────────────────────┘
                    │
                    ▼
┌─────────────────────────────────────────┐
│ Determining a second pixel value for each of a │
│ second set of pixels based on a second random  │    1304
│ timing sequence (S1^)                          │
└─────────────────────────────────────────┘
                    │
                    ▼
┌─────────────────────────────────────────┐
│ Calculate a depth estimation for each pixel    │    1306
│ based on a ratio of S1^ to S0^ and a constant  │
└─────────────────────────────────────────┘
```

FIG. 13

INTERFERENCE HANDLING IN TIME-OF-FLIGHT DEPTH SENSING

PRIORITY DATA

This application claims priority pursuant to 35 U.S.C. § 119 to U.S. Provisional Application Ser. No. 62/396,038 filed on Sep. 16, 2016, and of U.S. Provisional Application Ser. No. 62/431,395 filed on Dec. 7, 2016, both of which are hereby incorporated by reference in their entirety.

TECHNICAL FIELD

This disclosure pertains to interference handling for time-of-flight (ToF) depth sensing, and more particularly to interference handling for ToF depth sensing in a multiple-camera environment.

CONTEXT OF THE DISCLOSURE

An imaging system used for time-of-flight depth estimation can emit light (e.g., infrared light) to illuminate a scene, and can use the reflected light from the scene to estimate depth. In scenarios where multiple cameras are in use, light emitted from other imaging systems is also received by the primary imaging system's image sensor, resulting in interference. Interference can be caused by a camera's inability to distinguish the light from its own light source from received light emitted from other light sources.

BRIEF DESCRIPTION OF THE DRAWINGS

FIGS. 3A-B are schematic diagrams of an example multi-camera system in accordance with embodiments of the present disclosure.

FIG. 4A is a schematic diagram of an example of a single primary camera shutter pulse bundle scheme for taking depth frames.

FIG. 4B is a schematic diagram of an example interference scheme occurring at a primary camera due to the illumination pulse bundles of the interfering cameras that are added to the primary camera's own illumination pulse bundles (primary camera's own illumination pulse bundles are not shown, rather, interfering cameras' illumination pulse bundles are overlaid to the primary camera's shutter pulse bundles that are shown in FIG. 4A).

FIG. 5A is an example process flow diagram for determining an available pulsing scheme timing location in accordance with embodiments of the present disclosure.

FIGS. 9A-B are example formulas for the theoretical values of signals recorded in odd- and even-valued row of pixels in an imaging sensor.

FIG. 11 is a schematic diagram of determining an S0^ final pixel value using S0 and <u>S0</u> values, an S1^ pixel using S1 and <u>S1</u> values and a depth value using S0^ and S1^ values in accordance with embodiments of the present disclosure.

FIG. 13 is a process flow diagram for estimating depth of a pixel in accordance with embodiments of the present disclosure.

DETAILED DESCRIPTION

Section I: Interference Handling Through Time Interleaving

Figure 1:
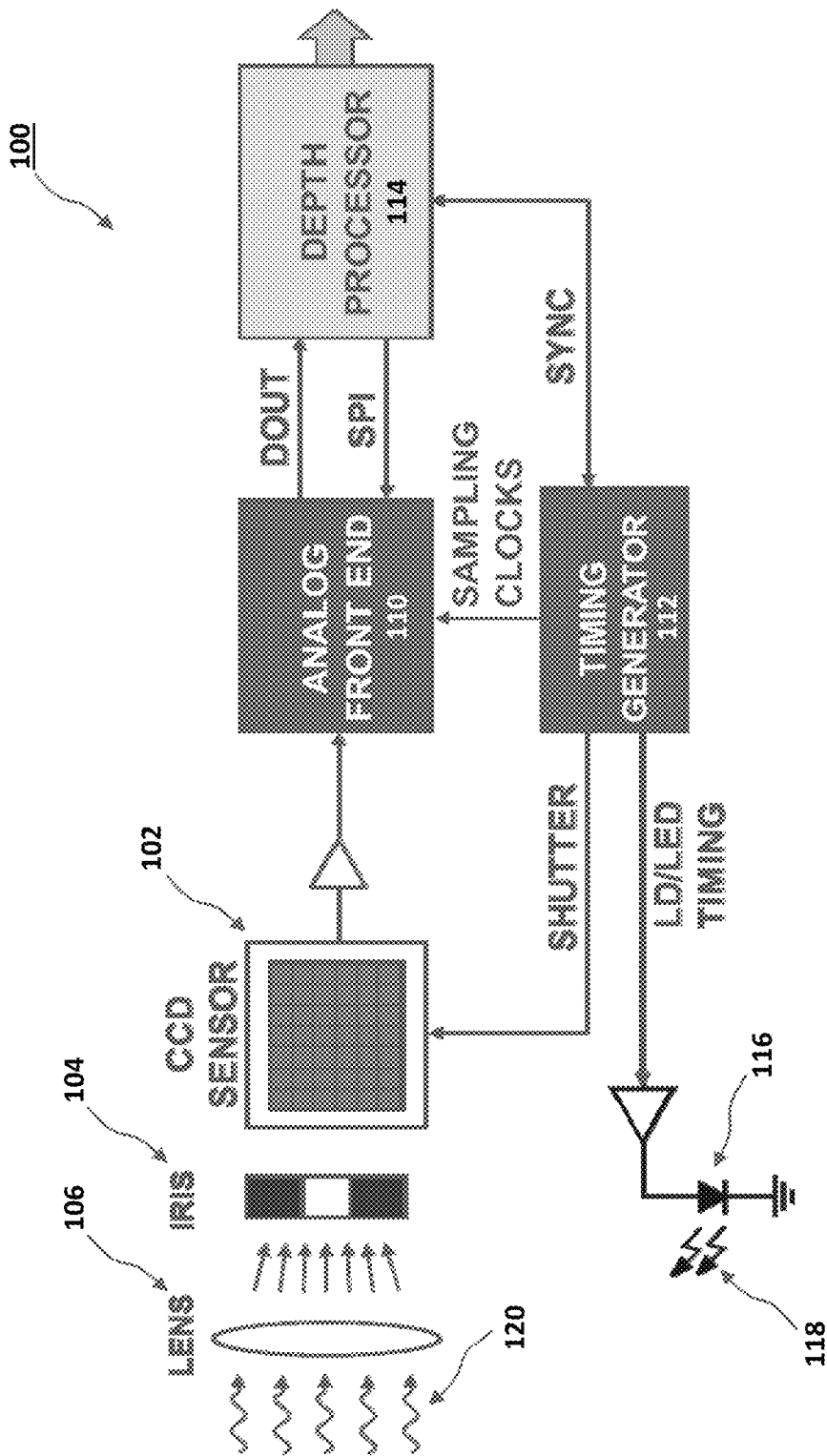
FIG. 1 is a schematic diagram of an example imaging system in accordance with embodiments of the present disclosure.

FIG. 1 is a schematic diagram of an example imaging system 100 in accordance with embodiments of the present disclosure. Imaging system 100 includes an image sensor 102. Image sensor 102 can be a charge coupled device (CCD) sensor, CMOS image sensor (CIS), or any array imager with a global shutter mechanism. The imaging system 100 can include one or multiple image sensors 102. Image sensor 102 can include a filter or other mechanism for color differentiation. Image sensor 102 can include an array of pixels, the array having individually controllable pixels. For example, each pixel of the image sensor may be turned on to collect charge or turned off, so as to not collect charge. By extension, each row of the image pixel array can be turned on or off. Also by extension, each row forming the entire array can be simultaneously (or substantially simultaneously) turned on or off (i.e., the array of pixels can be switched on or off). The switching of a pixel from off to on to off can be analogous to the opening and closing of a mechanical shutter. The image sensor 102 can include a mechanical shutter. But the term shutter here can also refer to the electrically controlled switching of a pixel to collect charge for a time period and then to stop collecting charge.

The imaging system 100 can also include a light source 116 that can emit light 118. In some embodiments, the light source 116 can be a laser, such as an infrared laser and the emitted light 118 can be infrared light.

The shutter of the image sensor 102 and the pulse timing of the light source 116 can be controlled by a timing generator 112. During operation, the timing generator 112 can cause the light source 116 to emit pulses of light 118 and can also signal the shutter to open (collect charge) and close (cease collecting charge). An example of a pulsing scheme is shown in FIGS. 2A-B.

The light 118 emitted from the light source 116 can reflect off an object and be received at the imaging system 100 by the image sensor 102. The reflected light 120 can be focused by a lens 106. An iris 104 can act as an on-off shutter to control whether light 120 is received at the image sensor 102.

The received light 120 is converted into charge by the image sensor 102. More specifically, each pixel receives light and the light collected at each pixel is converted to electrical charge associated with a pixel location. The collective charge is transmitted to an analog front end (AFE) 110 for processing. The AFE 110 also includes an input for timing information from the timing generator 112. The AFE 110 can transmit image data to the depth processor 114 for depth estimation.

Figure 2A:
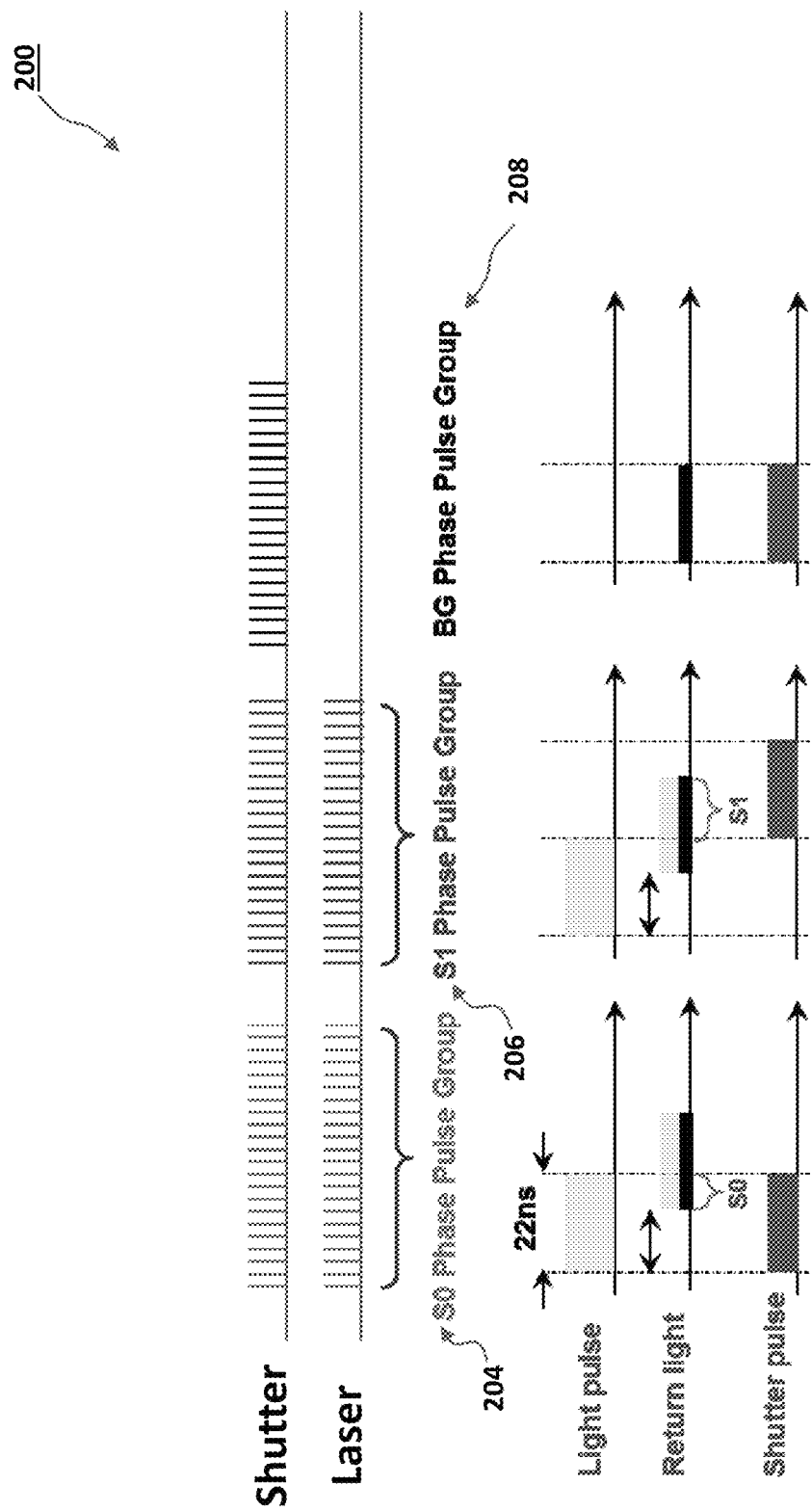
FIG. 2A is a schematic diagram of an example illumination scheme for estimating depth.
Figure 2B:
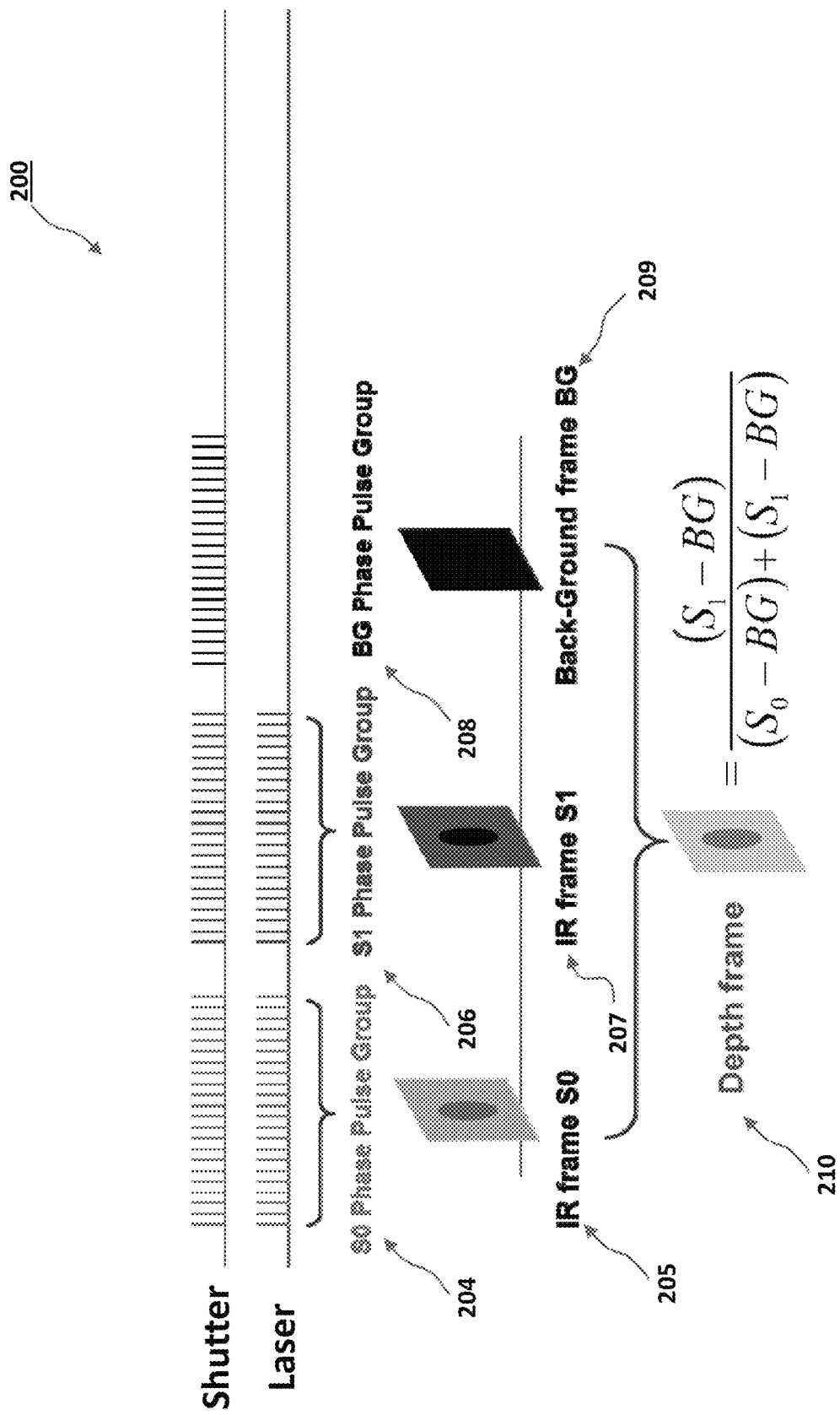
FIG. 2B is a schematic diagram of obtaining an example depth frame.

FIG. 2A is a schematic diagram of an example of an illumination scheme consisting of (a) bundles of light pulses and periods of no illumination and (b) the timing of each light pulse relative to different shutters. In this example, three bundles of images are captured by the image sensor. In a first bundles S0, light is emitted based on, for example, a 22 ns pulse and a shutter is opened for a corresponding period of time. The shutter pulse opens the shutter of the image sensor so that reflected light can be captured by the image sensor. Due to a round-trip-time delay, a portion of the emitted light is captured by the image sensor before the shutter closes. In a second pulse bundle 206, light is emitted based on a 22 ns pulse and a shutter is opened for a corresponding period of time, but in the second bundle S1 206, the shutter pulse is delayed by an amount of time equivalent to the length of the laser pulse (e.g., 22 ns in the example of FIG. 2). In bundle S1, a portion of the light reflected from a scene is captured while the shutter is open. The round trip travel time for the light emitted can be calculated using the information from S0 and S1. Additionally, a third bundle BG 208 can include a shutter pulse without a light emission to capture background light reflections (i.e., reflections from background or ambient light and not from emitted light from the imaging system). Each bundle can be performed multiple times and the collected charges may keep accumulating during these multiple measurements in order to increase SNR and the accuracy of the depth measurements.

FIG. 2B is a schematic diagram of obtaining an example depth frame. In FIG. 2B, S0 bundle 204 can result in a S0 frame 205; S1 bundle can result in a frame 207; and BG bundle can result in a BG frame 209. A depth frame 210 can be created using a combination of frames S0, S1, and BG (i.e., by removing BG). An example equation for calculating depth includes:

$$(S1-BG)/[(S0-BG)+(S1-BG)]*(c\ T\_LD/2),$$

where c is the speed of light and T_LD the duration of the light pulse emitted by the light source.

FIGS. 3A-B are schematic diagrams of an example of a multi-camera system in accordance with embodiments of the present disclosure. FIG. 3A illustrates an example multi-camera system 300. Multi-camera system 300 includes camera 1 302, camera 2 304, and camera 3 306. Each camera is interested in capturing a depth image of the scene which includes an object 308. Camera 1 302 emits light 312 towards the object 308 and will use the reflected light from the object 308 to perform depth estimations. Camera 2 304 and camera 3 306 also emit light (314 and 316, respectively) toward the object 308, for similar purposes.

In FIG. 3B, the light reflected from the object can include light emitted from all three cameras. For example light received by camera 1 302 can include light 322, which includes light originally emitted from cameras 1-3. Likewise, for cameras 2 and 3. Because light and shutter pulses of a camera are timed with respect to each other to estimate round-trip-time of own light pulses and consequently the depth, receiving light from other light sources can create interference and distort depth estimation.

FIG. 4A is an example schematic diagram of a shutter pulsing scheme 400 for taking depth frames. In FIG. 4, each rectangular shaped block represents a pulse bundle: for example, block 204 represents a bundle of S0 shutters from FIG. 2A; block 206 represents a bundle of S1 shutters from FIG. 2A; and block 208 represents a bundle of BG shutters from FIG. 2A. Also shown are dead times 402 between bundle set 401, i.e. periods where no measurements are made and no pulses of light are sent. Each bundle set 401 is performed 6 times in this example where dead times may exist between pulse bundles, preceding pulse bundles or following pulse bundles.

FIG. 4B is a schematic diagram 450 of an example interference scheme occurring at a primary camera due to the illumination pulse bundles of interfering cameras that are added to the primary camera's own illumination pulse bundles. Primary camera's own illumination pulse bundles are not shown in FIG. 4B, rather, interfering cameras' illumination pulse bundles are overlaid to the primary camera's shutter pulse bundles that are shown in FIG. 4A to illustrate the fact that the primary camera may be receiving interference illumination while its shutters are open. If the shutter is open during an interfering light pulse from other cameras, light from other light sources can distort the measurement of own light pulses, reduce signal to noise ratio or result in an incorrect account of round-trip-time of the camera's own light pulses.

This disclosure describes interference handling by interleaving pulse bundles. If a central synchronization scheme is possible between cameras, then the cameras can be controlled to emit light pulse bundles in a certain order so that no overlap occurs. If synchronization is too difficult or impossible, each additional camera entering the landscape is programed to first determine the pulse landscape through a sequence of measurements to find a "quiet" interval. The camera can then use the quiet interval for placing its own pulse bundles. In this disclosure, the term "pulse landscape" can imply an addition or collection of patterns of pulse bundles that are being emitted by the other cameras in the same environment to illuminate the scene.

In order to increase the number of available "quiet" intervals, every camera may intentionally increase the dead time between light pulse bundles, for example by decimating its frame rate by a certain number N, which allows about a factor of N increase in the number of cameras that can fit the landscape without interfering with one another. The duty cycle that each camera uses for light pulse bundles is also predetermined (e.g., by a camera manufacturer) so that the duty cycles are substantially the same. Overlap can still occur if duty cycles are not normalized. Decreasing the duty cycle of pulse bundles also increases the dead time between pulse bundles, which in turn increases the number of cameras that can fit the landscape without interfering with one another. The reduction in power due to the decrease in the duty cycle can may be compensated by an equivalent increase in the power or the number of illumination sources on the cameras in order to maintain a similar SNR.

A camera entering a multi-camera environment (or one that when enters creates a multi-camera environment) can begin sensing (e.g., by opening its shutter for a predetermined period of time) the landscape to find the next available spot. A camera can perform its availability search as follows:

FIG. 5A is an example process flow diagram for determining available pulsing locations in accordance with embodiments of the present disclosure. The camera first opens its shutter to detect light pulses from other cameras (502). The camera can determine whether an available slot exists by measuring the light received at several instances across a certain time period (504). The camera can determine the amount of collected light signals in each measurement instance that have the same (or substantially the same) values (506). The camera can also detect the presence of outlier values that indicate a change in light intensity from one measurement instance to a second measurement instance (or lack of any light intensity except background noise) (508). For example, the camera can identify a light measurement that has a different value than that of an adjacent grouping of measured light values.

The camera can then open its shutter at time instances that coincide with the outlier values and at time instances that are adjacent to the outlier values (510). The camera can then determine whether an outlier value indicates an available slot (or, if not, then the camera can determine that the outlier indicates a border between a first pulse bundle and a second (different) pulse bundle around which a spot is available, and take further measurements at a finer time resolution around the outlier value to determine a time slot with no or little light intensity) (512). The camera can use the available slot for pulse bundles for its own depth estimation (514).

Figure 5B:
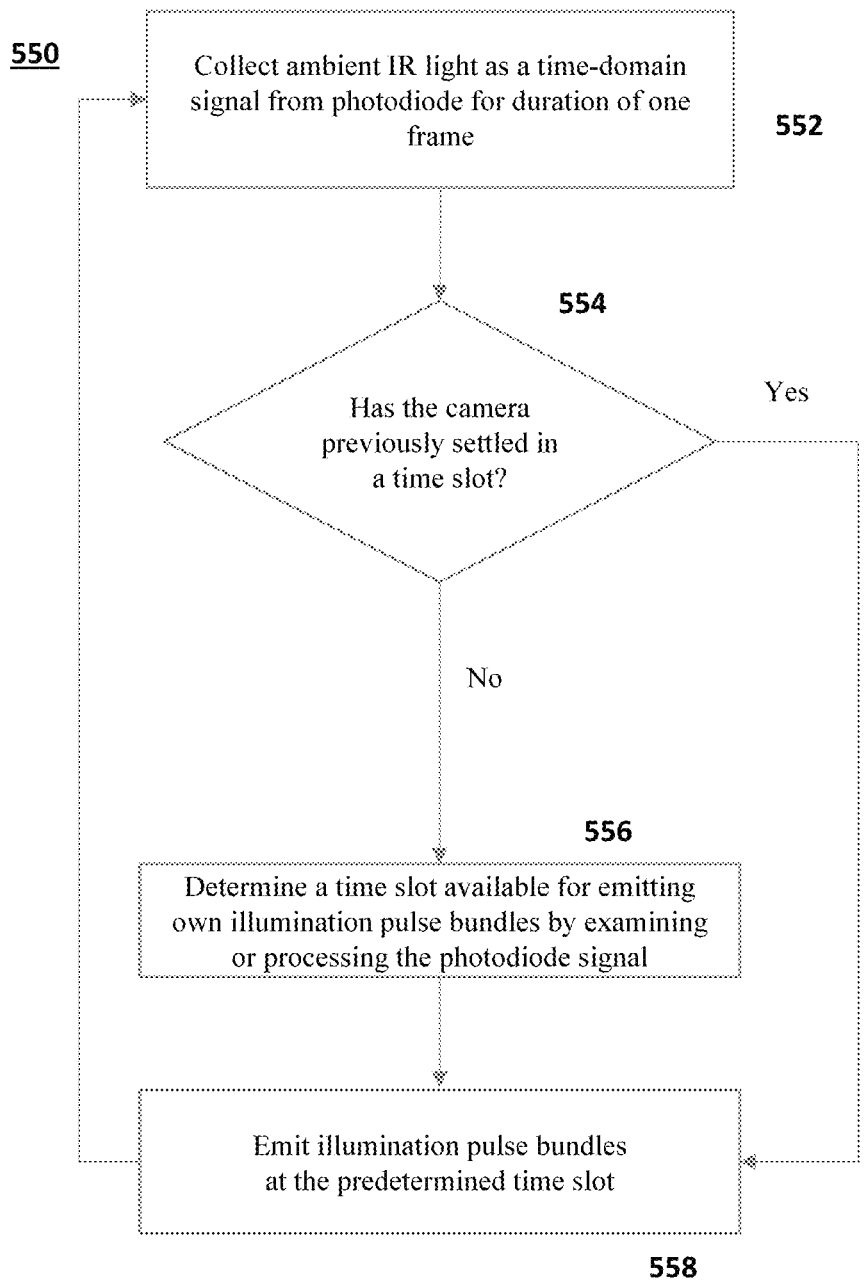
FIG. 5B is another example of a schematic diagram of how "dead times" between pulse bundles can be sensed for interleaving multiple cameras in interference-free or low-interference operation.

FIG. 5B is another example of a schematic diagram of how dead times can be sensed for interleaving multiple cameras for interference-free or low-interference operation. In particular FIG. 5B illustrates an example protocol describing how an additional circuit that can be added to FIG. 1 consisting of a photodiode or other light sensitive device (similar to the one in FIG. 5C) can be used to determine a time slot during which no other cameras are emitting light or during which the emission is weak enough so that a new camera can start using that time slot. The photodiode or the light sensitive device can be used in conjunction with an ADC to continuously monitor the ambient light by measuring it at a predetermined sampling rate (552). If a camera is entering a multi-camera environment (hence has not previously been assigned to a time slot which is determined at step 554), then the camera may determine an available time slot by processing or examining the time signal obtained from the photodiode or the light sensitive device (556). This camera may choose to emit light during the period in which the amount of ambient light from other interferers is below a predetermined threshold or nonexistent. For the following frames, the camera may continue to emit light and take measurements in this determined time slot (558). In FIG. 5B, if the camera has previously been assigned to a time slot, it may continue to emit light and take measurements in the time slot it has been assigned to by directly moving from step 554 to 558.

In FIG. 5B, a camera that has already been assigned to a time slot may use the measurements of the photodiode or the light sensitive device (552) to continuously monitor the interference in its own time slot and/or other time slots, and decide to switch to another slot if its own slot starts receiving interference beyond a predetermined threshold due to the arrival of additional cameras, relative clock drifts, etc., or if other slots that have lower interference become available.

In FIG. 5B, in the very unlikely case of several cameras being initiated exactly at the same time instance, many or all the cameras may be sensing the environment without actively illuminating it to determine a time slot that they can emit own pulse bundles, leading to an inaccurate account of the amount of interference from the viewpoint of any given camera. In order to avoid such ambiguities, a further initial step to be taken before step 552 may consist of generating a random or pseudorandom number locally at each camera which may be proportional to the amount of time measured in, e.g., frames, or seconds, which that particular camera will wait before starting to measure the background interference. Since the likelihood of any two cameras generating the same random number can be made as small as desired by appropriately choosing the probability distribution from which the random numbers are generated, this operation allows the cameras to start measuring interference in an order dictated by the ordering of the random numbers generated. Therefore, the procedure described in FIG. 5B will remain suitable even if the cameras are initiated at the same time instance.

In some example embodiments, the identification of available time slots in FIG. 5B can include cross correlating a desired emission pattern with a measured engagement function. A camera system can identify a desired emission pattern for light emission for capturing depth images from a scene. The desired emission pattern can be preprogrammed into the camera. The desired emission pattern includes a light intensity value (or a corresponding "high" binary value) and an emission timing for each light intensity value, as well as duty cycle, and other information. The location of available time periods for emission of laser pulses can be determined based on cross correlating the desired emission pattern with a measured engagement function, e.g., a measured set of light intensity values that provide information on engaged time slots. The time lag value at which the cross-correlation is smallest or gets below a predetermined threshold value may be chosen as the beginning of an available time slot for emission. The cross-correlation can be performed in a streaming manner to identify available time slots for emission.

The measured engagement function can be generated by receiving light by a photodiode. The light values can be converted to digital values by first sampling via an ADC and then by comparing the light intensity to a threshold value at each time instance. If a light intensity value exceeds the threshold value, a high or a 1 binary value is assigned for the corresponding time instance in the engagement function; if a light intensity value does not exceed the threshold (or if it is equal to the threshold), then a low or 0 binary value is assigned for the corresponding time instance in the engagement function.

Figure 5C:
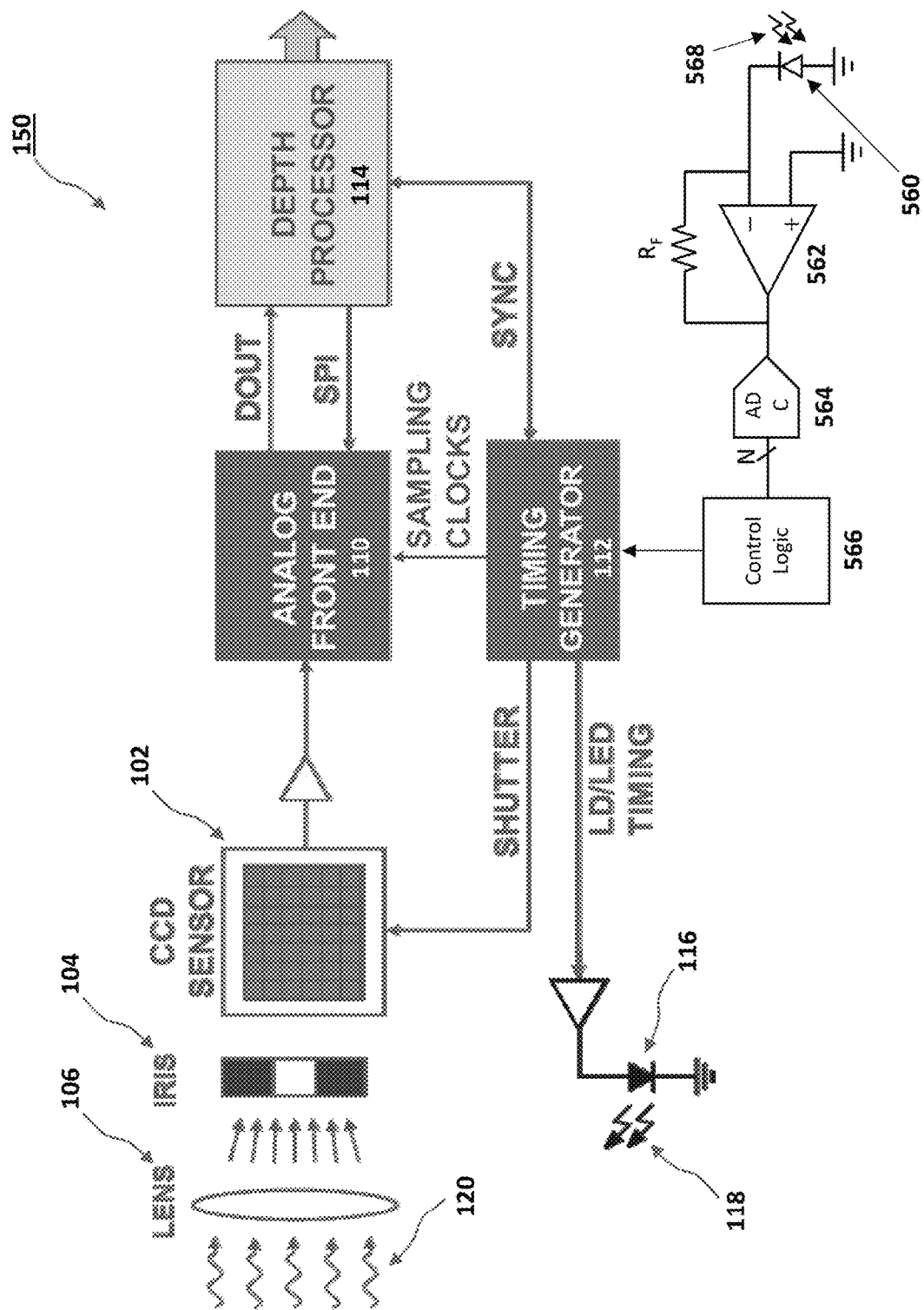
FIG. 5C is an example schematic diagram of an example imaging system equipped with an additional light sensitive device such as a photodiode that can act as a continuously running ambient light sensor for determining an available time slot as in FIG. 5B.

FIG. 5C is an example schematic diagram of an example imaging system 150 similar to the one in FIG. 1 further equipped with a light sensitive device 560 such as a photodiode that can act as a continuously running ambient light sensor for determining an available time slot as described in FIG. 5B. In this example, the photodiode 560 can sense the ambient light 568 stemming from both the interfering cameras and the primary camera (therefore may include light 120 from the primary camera's own illumination pulses). The photodiode may generate a current based on the ambient light it senses that may be turned into a voltage value by an operational amplifier 562 with a resistor in its feedback path. This voltage value may be sampled by an N-bit Analog-to-Digital Converter 564 (ADC) which feeds the samples to a Control Logic unit (566). The control logic then can determine which time instances are free from interference or have low interference and update the timing generator 112 in order to place illumination pulses and open the shutters accordingly.

FIGS. 6A-D are schematic diagrams of an example shutter pulsing scheme in accordance with embodiments of the present disclosure. FIGS. 6A-D illustrate a shutter pulsing scheme for a four camera environment. The illumination pulses maybe sent out aligned with these shutters or delayed by predetermined amounts similar to the example in FIG. 2A. The delay amount between illumination pulses and shutter pulses may be orders of magnitude smaller than the spacing between pulse bundles; therefore the illumination pulses may be considered also to be aligned with the shutter pulses for all practical purposes. Moreover, during some periods in which the shutter is open, there may be no illumination such as the background measurement period 208 in FIG. 2A. Therefore, the illumination pulse bundles may even span narrower time periods than the shutter pulse bundles.

Figure 6A:
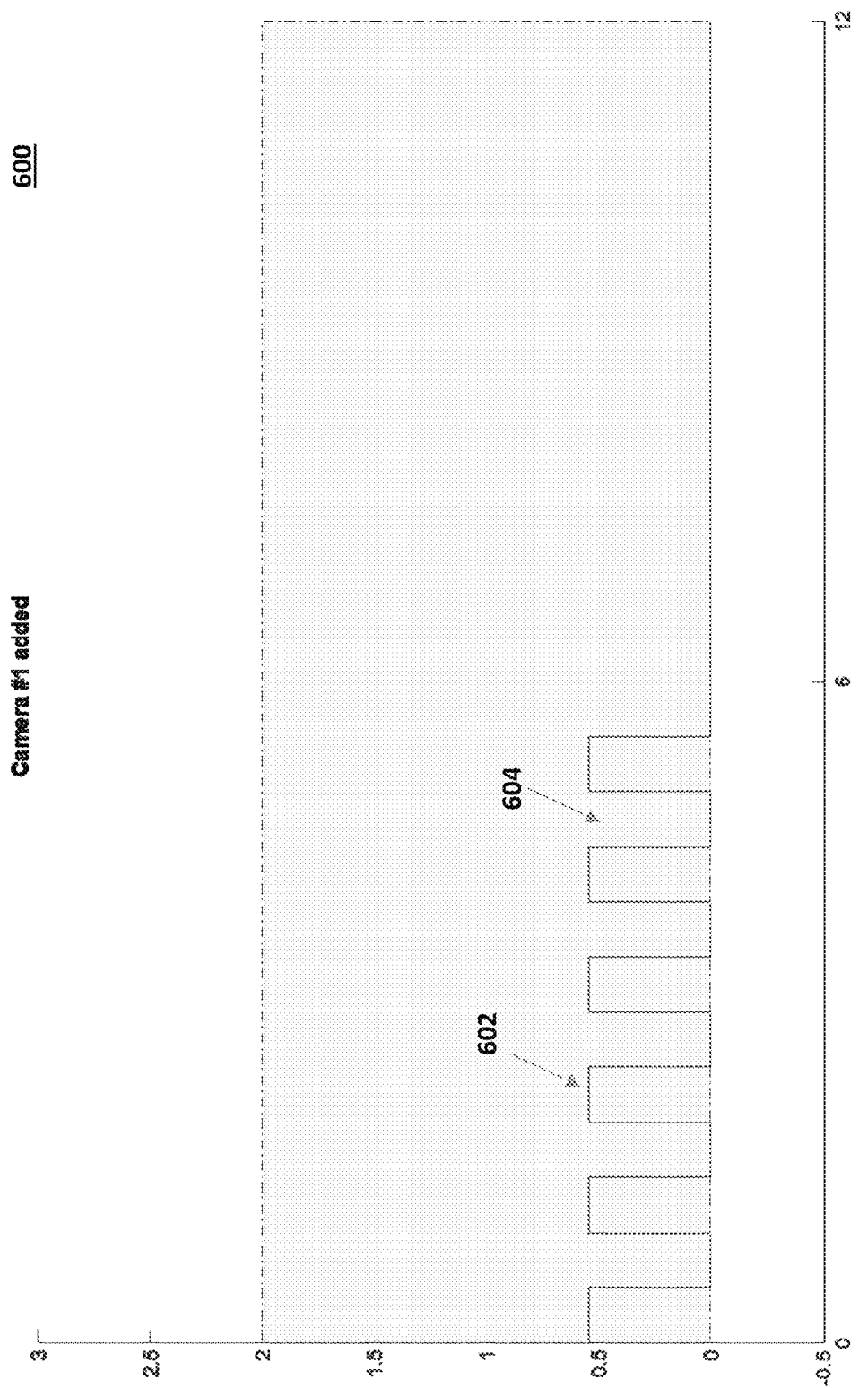
FIGS. 6A-D are schematic diagrams of an example pulsing scheme in accordance with embodiments of the present disclosure.

In FIG. 6A, the pulsing scheme 600 is illustrated. Pulsing scheme 600 includes a first shutter pulse bundle 602. FIG. 6A also illustrates dead time 604 between shutter pulse bundles 602.

Figure 6B:
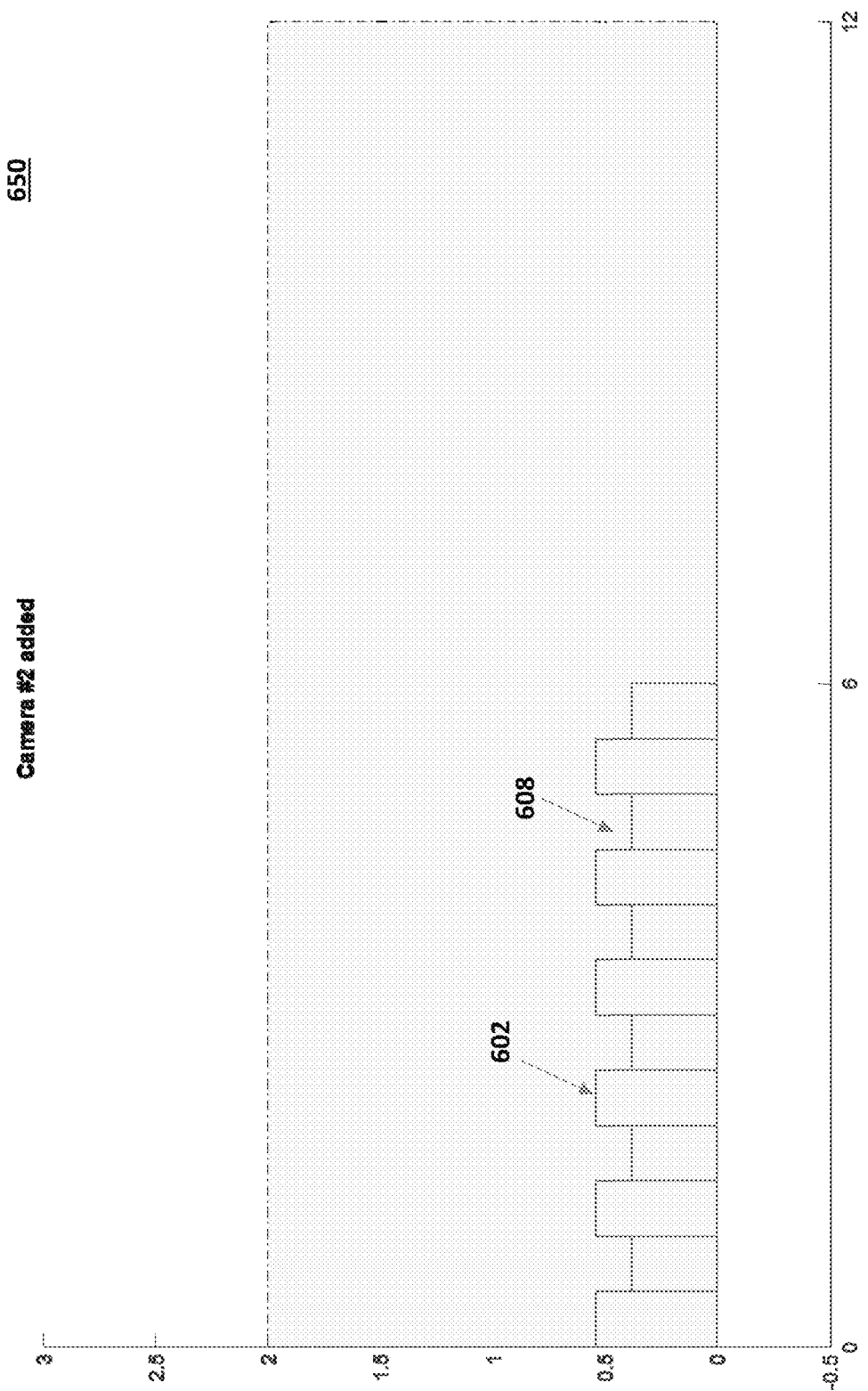

FIG. 6B illustrates an interleaved pulsing scheme 650 for a two camera environment. Pulse bundles 608 for the second camera are timed within the dead time 604 (now occupied by the pulse bundles 608 for camera 2).

Figure 6C:
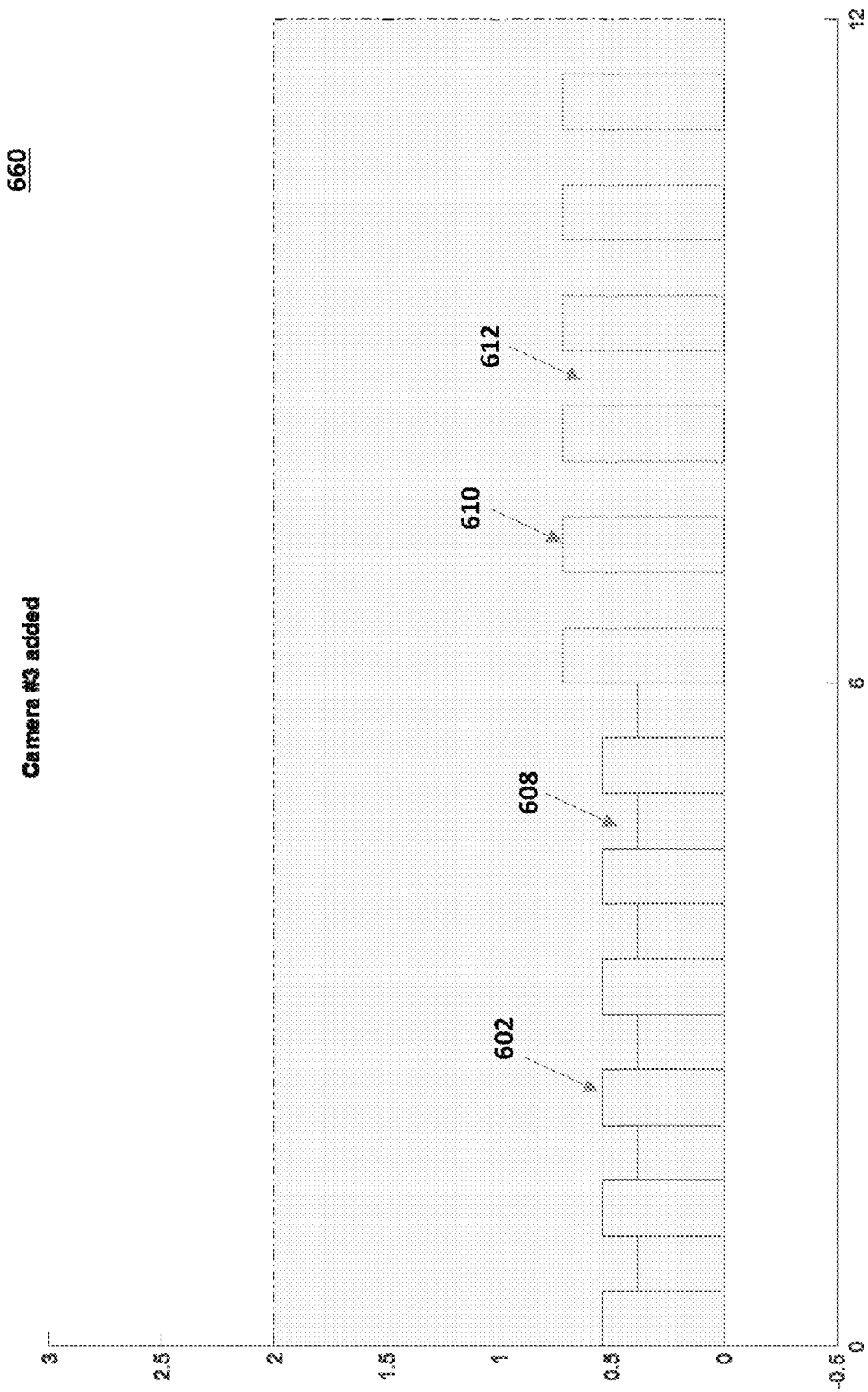

FIG. 6C illustrates an interleaved pulsing scheme 660 for a three camera environment. Dead time 612 still exists between pulse bundles 610.

Figure 6D:
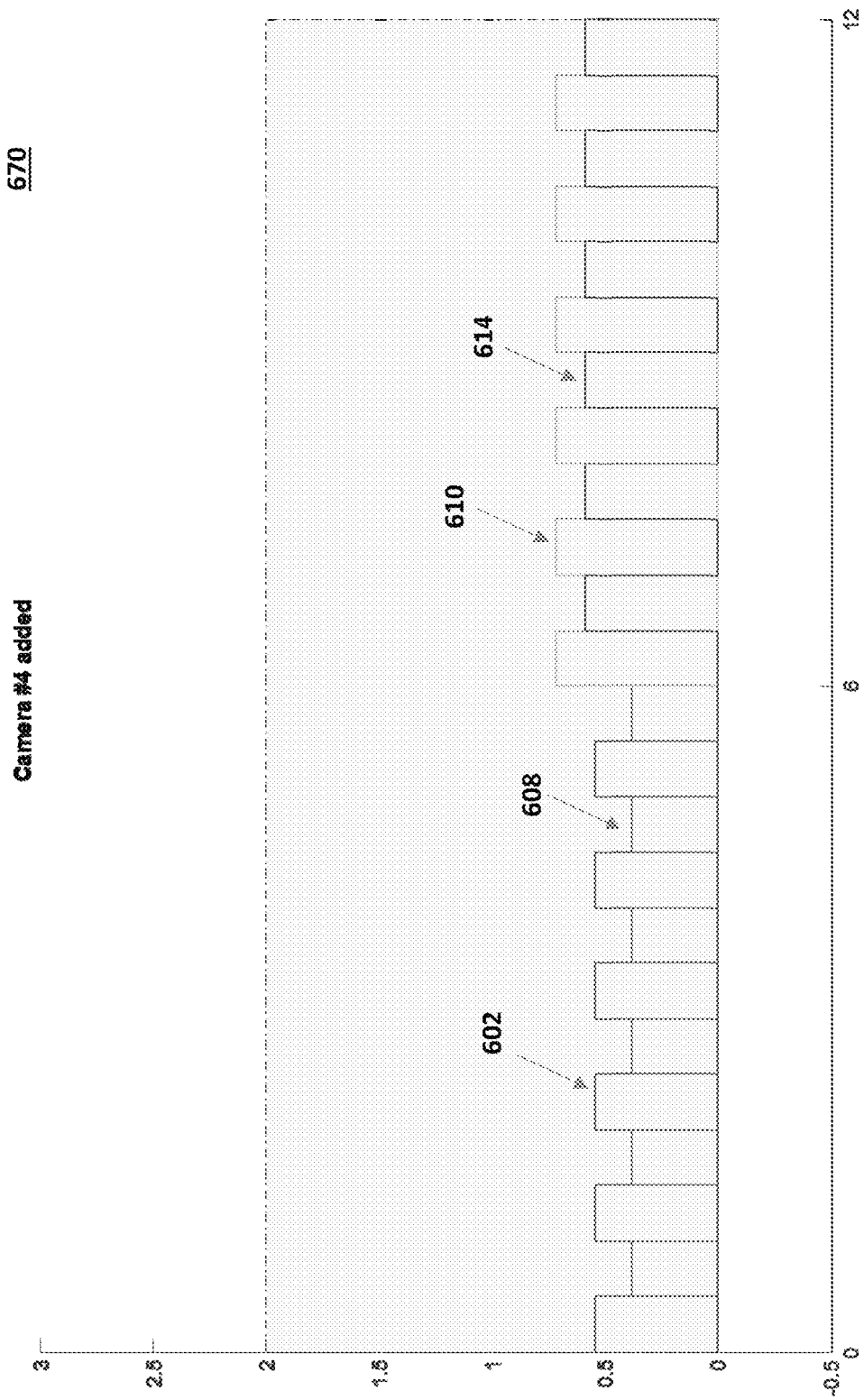

FIG. 6D illustrates an interleaved pulsing scheme 670 for a four camera environment. Pulse bundles 614 are timed within previously dead times 612.

When larger numbers of cameras are expected, the duty cycle of each pulse bundle can be reduced to introduce more dead time available to accommodate the new cameras. The reduced duty cycle corresponds to reduced illumination power which in turn may lead to decreased SNR. However, this can be mitigated by adding more illumination sources such as more infrared lasers. For example, a reduction by half in the duty cycle may be compensated by doubling the number of lasers.

Section II: Interference Handling Through Complementary Shutter Sequences

A camera can remove background and interference at the pixel level by having some pixels of the sensor array capture light that includes light emitted by the camera's own light source as well as background light and light emitted by other cameras (interference), and by nearly concurrently having some other pixels of the sensor array capture light that only includes background light and light from other cameras (interference). Pixel values without background light and interference can be obtained algorithmically from these two types of measurements. An example of a subset of pixels that captures light that includes light emitted by the camera's own light source as well as background light and light emitted by other cameras (interference) can include all pixels in even numbered rows of the sensor array. An example of a subset of pixels that nearly concurrently captures light that only includes background light and light from other cameras (interference) can include all pixels in odd numbered rows of the sensor array. Other configurations of pixel subsets can be used; however, this even-subset and odd-subset example is illustrated further below:

In some embodiments, a camera can use two complementary random shutter sequences for two different subsets of pixels, e.g., odd numbered and even numbered rows of pixels, so that one of the subsets of pixels (e.g., the even rows) collects light only when the other subset (e.g. the odd rows) does not, and vice-versa, by, for instance, electrically controlling the collection of light on a pixel-by-pixel basis or on a row-by-row basis. Using the row-by-row basis as an example, embodiments can include capturing light emitted by the camera's own light source, background light and interference light from other cameras using e.g., pixels in even numbered rows of the image sensor, and capturing background light and interference light using e.g. pixels in odd numbered rows.

A first timing pulse sequence can trigger shutter sequences S0 and S̲0̲: A high shutter pulse can open a shutter that is synchronized with the camera's light source so as to capture light that includes light emitted by the camera's own light source (S0); and In a second operation, a low shutter pulse can open a shutter to capture light that does not include emitted light from the camera's own light source (e.g., background and interference) (S̲0̲).

A second timing pulse sequence can trigger shutter sequences S1 and S̲1̲: A high shutter pulse can open a shutter that is synchronized with the camera's light source so as to capture light that includes light emitted by the camera's own light source (S1); and In a second operation, a low shutter pulse can open a shutter to capture light that does not include emitted light from the camera's own light source (e.g., background and interference) (S̲1̲).

The raw S0 and S̲0̲ values captured at nearby pixels, or adjacent pixels can be mathematically combined to obtain a processed value, S0^, for each pixel, which contains only the light emitted by the camera's own light source and does not contain the background light or the interfering light from other cameras. Similarly, the raw S1 and S̲1̲ values captured at nearby pixels or adjacent pixels can be mathematically combined to obtain a processed S1^ value for each pixel, which contains only the light emitted by the camera's own light source and not the background light or the interfering light from other cameras. The so-obtained processed S0^ and S1^ values can be used to obtain a depth estimate for each pixel. The process of obtaining the final processed pixels S0^ and S1^, as well as obtaining a depth estimate from them, are described in more detail below.

Figure 7:
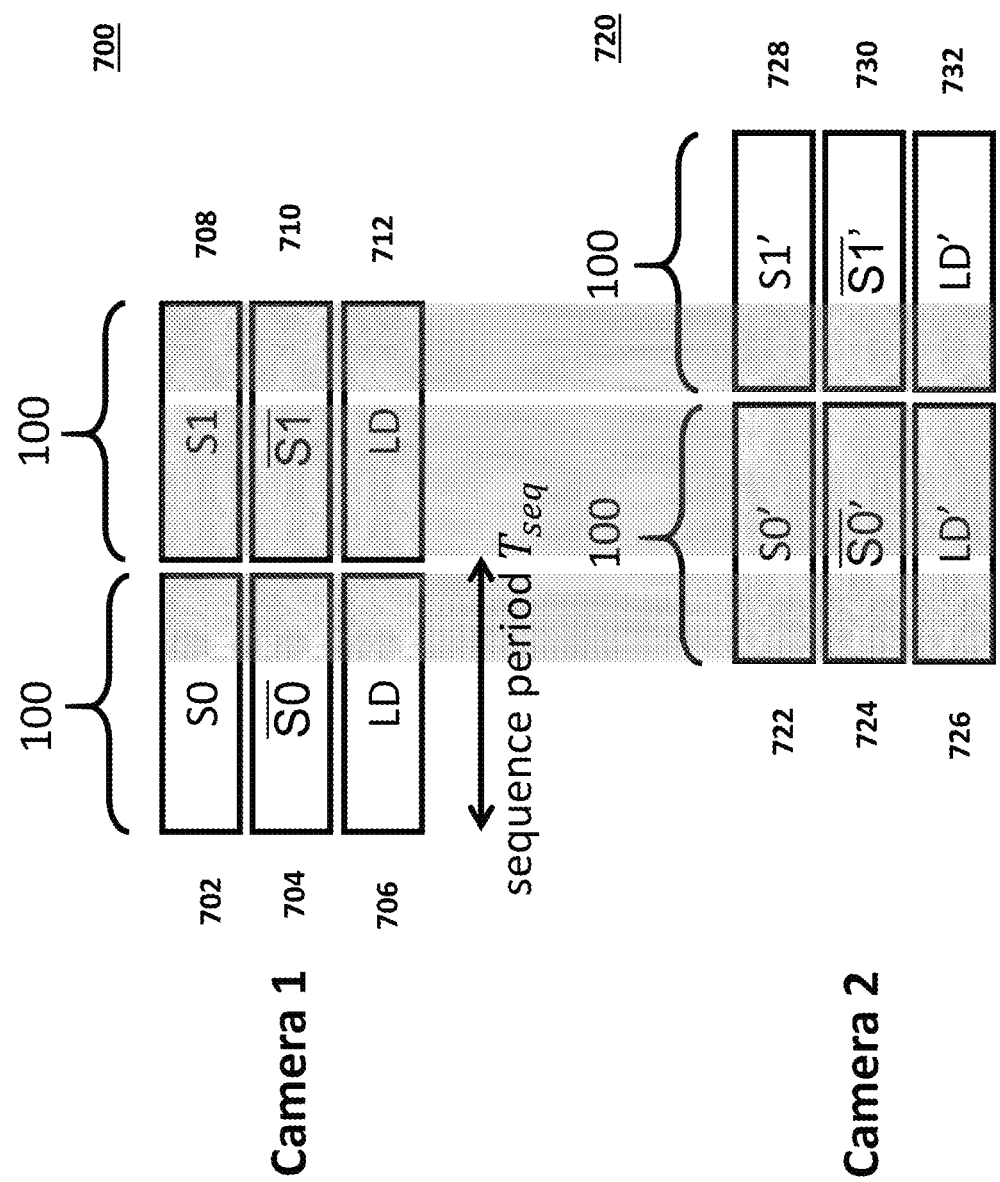
FIG. 7 is a schematic diagram of an example pulsing scheme of two interfering imaging systems in accordance with embodiments of the present disclosure.

FIG. 7 is a schematic diagram of an example pulsing scheme 700 in accordance with embodiments of the present disclosure. Pulsing scheme 700 illustrates how two cameras can perform pulse scheme execution without also capturing separate background frames. Each camera collects light using a S0 shutter/illumination sequence for some pixels and a S̲0̲ shutter/illumination sequence for other pixels and a S1 shutter/illumination sequence for some pixels and a S̲1̲ shutter/illumination sequence for other pixels.

More specifically, camera 1 can perform, for example, 100 S0 702 shutter pulses for a portion of the image sensor grid, and S1 708 shutter pulses for the same portion of the sensor array for light emission pulses 706 and 712, respectively. Pulse scheme 700 also includes pulses that open the shutter (S0 704 and S1 710) while no light pulses are emitted for another portion of the sensor array.

Pulse scheme 720 applies to camera 2. Camera 2 can perform 4000 S0' 722 shutter pulses for a portion of the image sensor array, and S1' 728 shutter pulses for the same portion of the sensor array for 4000 light emission pulses 726 and 732, respectively. Pulse scheme 720 also includes pulses that open the shutter (S0' 724 and S1' 730) while no light pulses are emitted for another portion of the sensor array.

Figure 8:
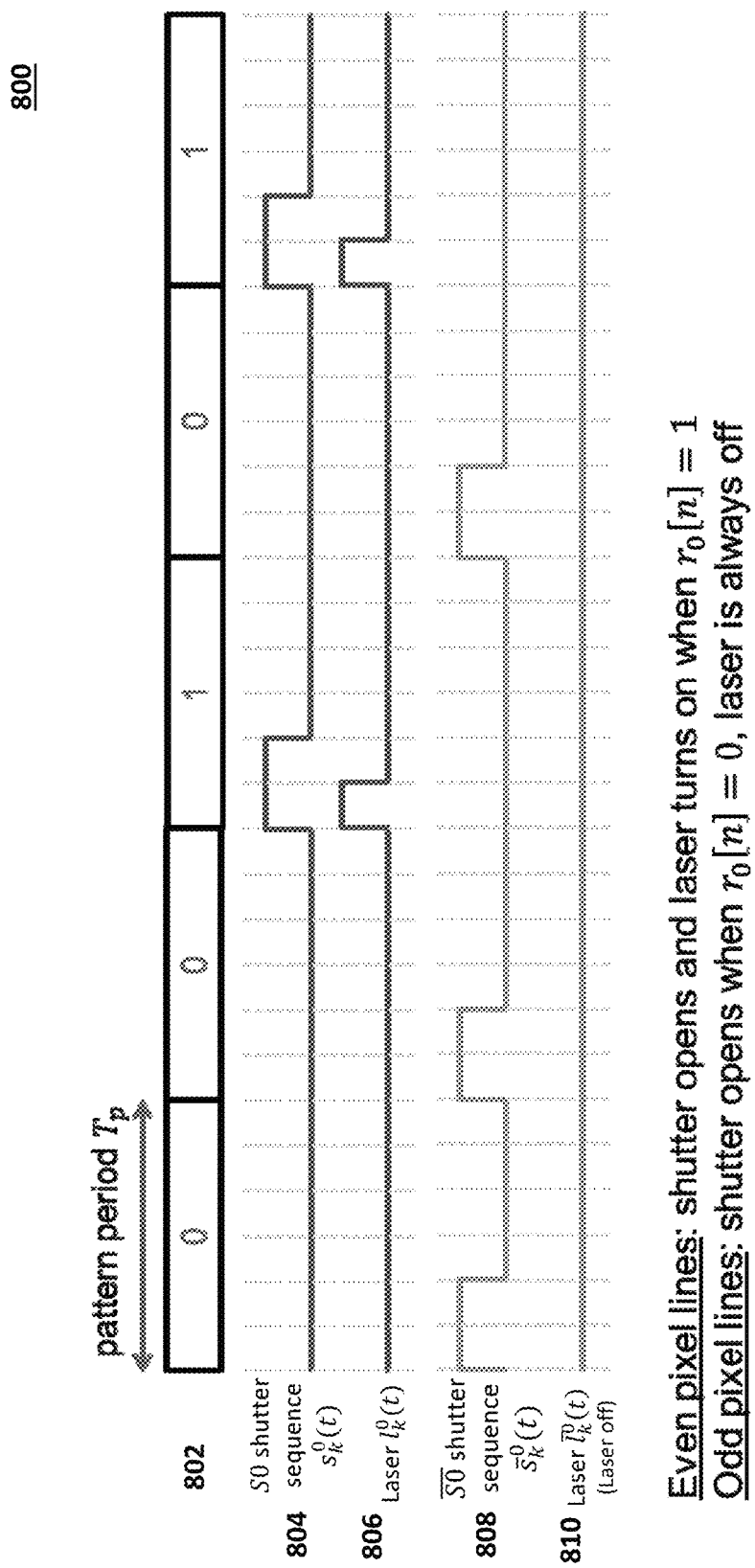
FIG. 8 is an example pulsing and shutter scheme for odd- and even-numbered rows of pixels in an imaging sensor in accordance with embodiments of the present disclosure.

FIG. 8 is a schematic diagram of a timing sequence 800 for performing a pulse scheme in accordance with embodiments of the present disclosure. Timing sequence 800 represents a detailed perspective of the pulse schemes shown in FIG. 7 (e.g., pulse scheme 702 corresponding to pulse sequence 804 for S0 shutter sequences, and pulse scheme 706 corresponding to pulse sequence 806 for the LD illumination sequences).

In the example of FIG. 8, a random pattern 802 is generated to indicate shutter pulse and laser activation for S0. When the pattern indicates a zero or low value, the light source 810 does not emit light. However, the odd numbered rows (for example) from the image sensor array collect background and interference light (i.e., odd rows: shutter 808 is open; even rows: shutter 804 is closed). The odd row shutter 808 stays open for a predetermined amount of time, then closes. When the pattern indicates a one or high value, the light source 806 emits a light and the even numbered rows from the image sensor grid collect background and interference light (i.e., even rows: shutter 804 is open; odd rows: shutter 808 is closed) as well as light emitted by the light source 810. After a predetermined number of pulse iterations (e.g., 4000), the S0 pixel value is equal to the value given by equation provided in FIG. 9A. FIG. 9B provides a legend for the quantities in the equation of in FIG. 9A. The equation shows that a pixel value obtained using S0 sequence contains the desired value corresponding to light emitted by the camera's own light source, plus an error term corresponding to background light plus interference light; whereas a pixel value obtained using the S0 sequence only contains the error term. Therefor the error term can be identified and removed from the pixel value obtained using S0 pulse sequence.

It is understood that the pixels or rows of pixels used for collected S0 and S0 values can be different than that described above. For example, the S0 pixel value can be obtained from the odd rows, and the S0 pixel value could be obtained from the even rows.

Figure 10:
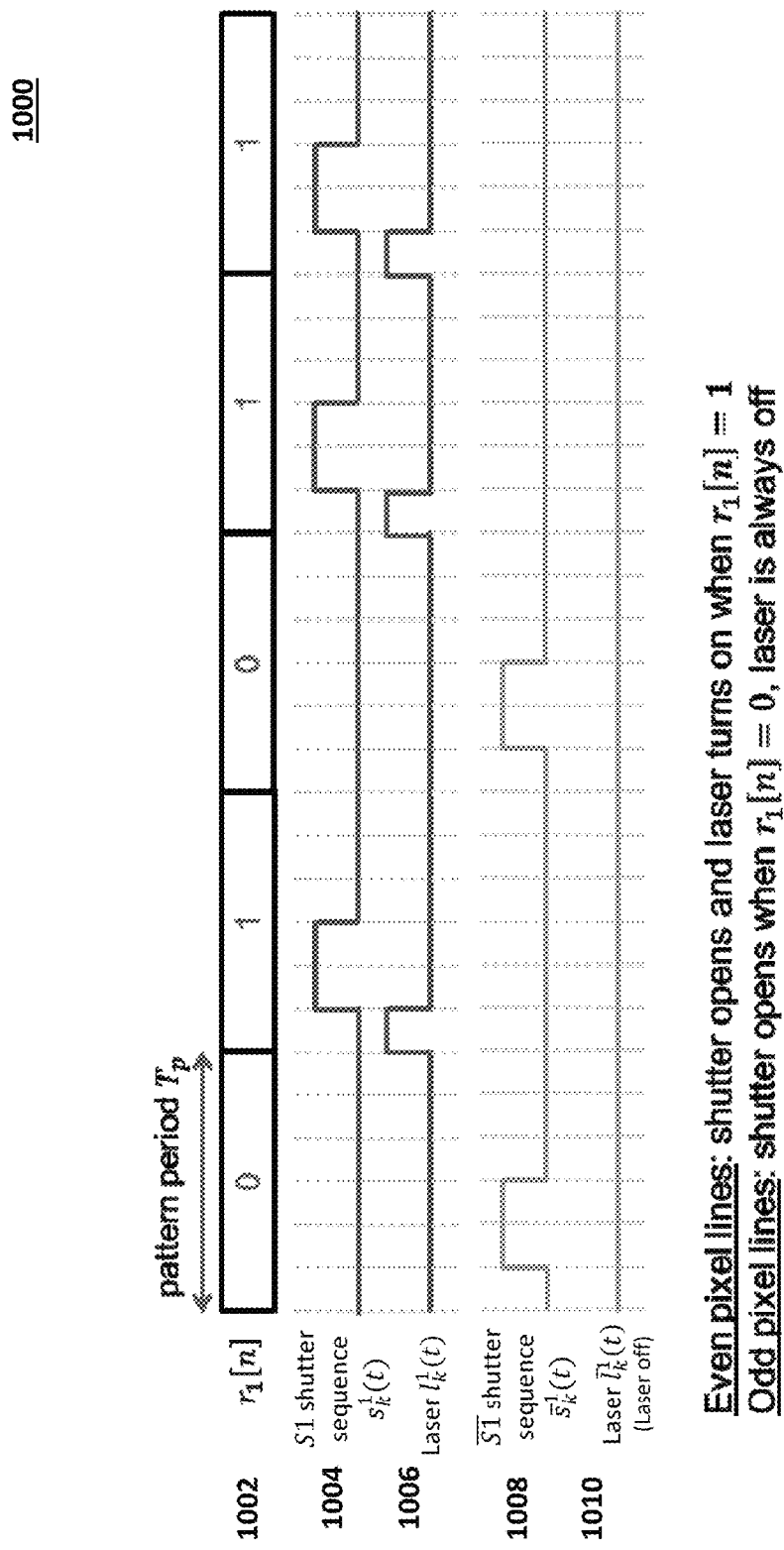
FIG. 10 is a schematic diagram of a timing sequence for performing a pulse scheme in accordance with embodiments of the present disclosure.

FIG. 10 is a schematic diagram of a timing sequence 1000 for performing a pulse scheme in accordance with embodiments of the present disclosure. In the example of FIG. 10, a random pattern 1002 is generated to indicate shutter pulse and laser activation for S1. The random patter 1002 can be different from the random pattern 802. When the pattern indicates a zero or low value, the light source 1010 does not emit light. However, the odd numbered rows from the image sensor array collect background and interference light (i.e., odd rows: shutter 1108 is open; even rows: shutter 1004 is closed). The odd row shutter 1008 stays open for a predetermined amount of time, then closes. When the pattern indicates a one or high value, the light source 1006 emits a light and the even numbered rows from the image sensor grid collect background and interference light (i.e., even rows: shutter 1004 is open; odd rows: shutter 1008 is closed). In embodiments, the shutter pulse can be delayed by a predetermined amount with respect to the light pulse. After a predetermined number of pulse iterations (e.g., 4000), the S1 pixel value is equal to the value given by equations similar to the one provided in FIG. 9A. The equation shows that a pixel value obtained using S1 sequence contains the desired value corresponding to light emitted by the camera's own light source, plus an error term corresponding to background light plus interference light; whereas a pixel value obtained using the S1 sequence only contain the error term.

FIG. 11 is a schematic diagram of determining an S0^ final pixel using S0 and S0 values in accordance with embodiments of the present disclosure. Also provided is a formula for providing depth that uses the values of both S0^ and S1^.

Figure 12:
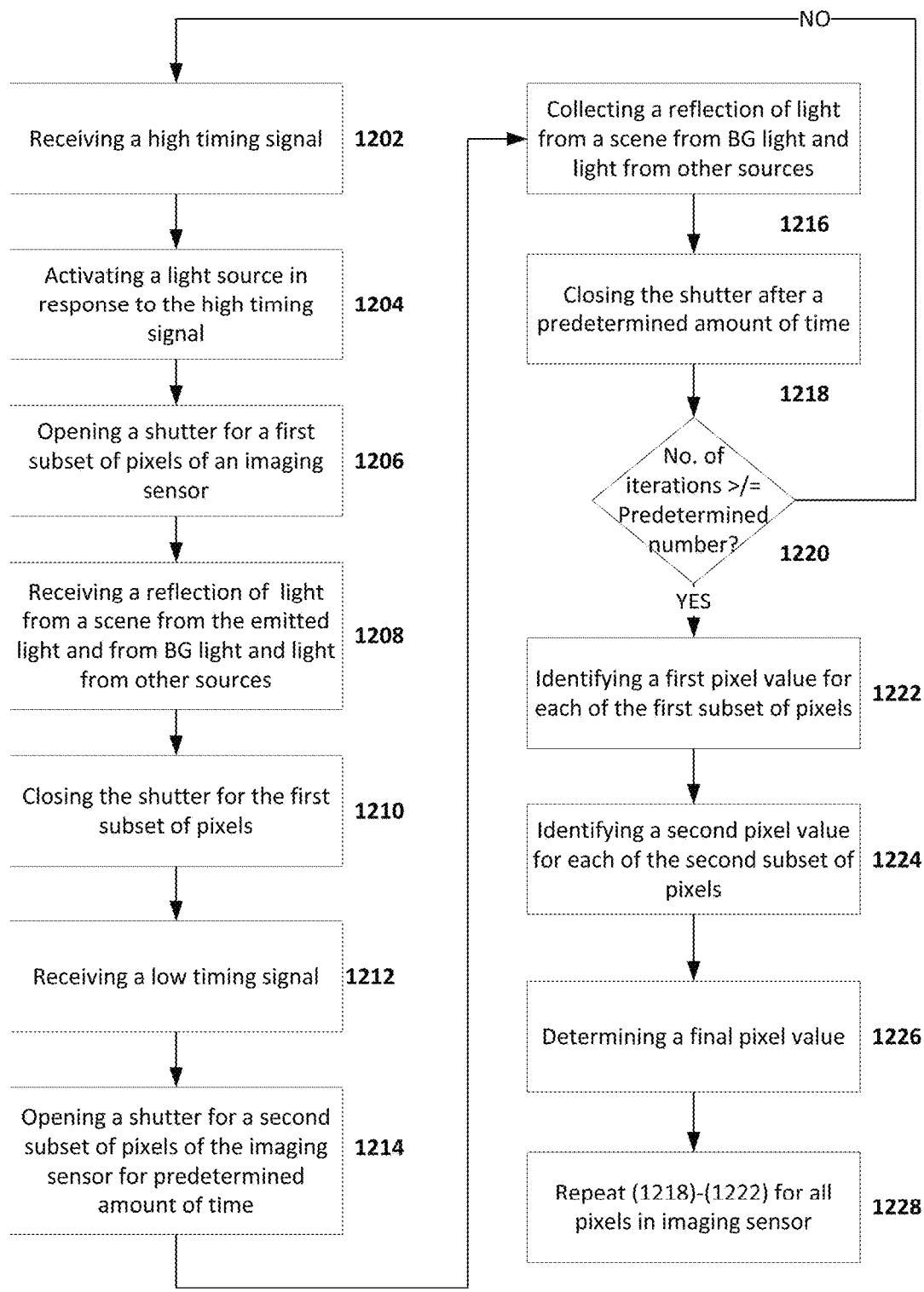
FIG. 12 is a process flow diagram for estimating a final pixel value through interference handling in accordance with embodiments of the present disclosure.

FIG. 12 is a process flow diagram 1200 for estimating a final pixel value through interference handling in accordance with embodiments of the present disclosure. A timing generator of the imaging system (e.g. comprising a linear-feedback register LFSR) can generate a random timing sequence for activating a light source and opening a shutter for a subset of pixels of an imaging sensor. In the example provided here, upon receiving a high timing signal (1202), the light source activates for a predetermined time period, and emits light towards a scene, the light being reflected back to the imaging system (1204). After a predetermined amount of time, the light source deactivates. The time period of activation to deactivation can be on the order of tens of nanoseconds. The high signal also triggers the opening of a shutter for a first subset of pixels on the image sensor; the opening of the shutter can coincide with the activation of the laser, or the opening of the shutter can be time delayed from the activation of the laser (1206). While the shutter is open, the first subset of pixels on the image sensor can collected light reflected off the scene coming from the camera's own light source, as well as light reflected off of the scene from background light and from other active light sources (1208). After a predetermined time period, the shutter closes (1210). Steps 1204-1210 can be repeated for every high signal received, which can occur as many as 500 to 4000 times or more. As an example, the subset of pixels can be all pixels within rows of the image sensor, such as all even row pixels.

In the example provided here, upon receiving a low timing signal (1212), a shutter is opened for a second subset of pixels of the imaging sensor for a predetermined amount of time, and then closed (1214). As an example, the second subset of pixels can include all pixels in odd numbered rows of the image sensor. The low signal does not trigger the emission of light from the imaging system. So all of the light collected by the second subset of pixels includes background light and light received from other light sources from other imaging systems (1216). After a predetermined amount of time, the shutter is closed (1218).

Steps 1204-1218 can be performed for a predetermined number of iterations (1220). For example, after 4000 high and low signals, the imaging system can begin processing the charges captured by each pixel.

The imaging system can determine a pixel value (referred to as a first pixel value) for each pixel of a first subset of pixels (1222). For example, the value for $S0_k[i,j]$ can be determined based on an equation such as that shown in FIG. 9A. The imaging system can determine a pixel value (referred to as a second pixel value) for each pixel of the second subset of pixels (1224). For example, the value for $\underline{S0}_k[i,j]$ based on an equation such as that shown in FIG. 9A. The imaging sensor can determine a final pixel value S0^ based on S0$_k$[i,j] and S0$_k$ [i,j]. As an example, S0^ can be determined based on a first pixel value for two neighboring pixels in a first row and a second pixel value from a second row adjacent the first row, the second pixel adjacent the first pixel for both neighboring pixels (1226). For example, S0^$_k$[i,j] can be determined based on S0$_k$[i,j] and S0$_k$[i,j] as shown in FIG. 9A. The pixel value calculations of steps 1222-1226 can be repeated for all pixels making up an image having a desired resolution (1228).

The process in FIG. 12 can be repeated using a unique timing signal to acquire S1^. FIG. 13 is a process flow diagram 1300 for estimating depth of a pixel based on two final pixel values S0^ and S1^. The imaging system can determine a final pixel value S0^ for each of a first set of pixels based on a first random timing sequence (S0^ based on S0 and S0) (1302). The first set of pixels includes S0 and S0 for each corresponding physical pixel of the sensor. The imaging system can determine a final pixel value S1^ for each of a second set of pixels based on a second random timing sequence different from the first timing sequence (S1^ based on S1 and S1) (1304). The second set of pixels includes S1 and S1 for each corresponding physical pixel of the same sensor. The imaging system can calculate an estimated depth for each pixel based on S0^ and S1^, as shown in FIG. 11 (1306).

III. Combining "Interference Avoidance" and "Interference Cancellation" Algorithms This disclosure describes two solutions for interference due to multiple ToF cameras operating simultaneously: "Interference Handling Through Time Interleaving" and "Interference Handling Through Complementary Shutter Sequences."

Figure 14:
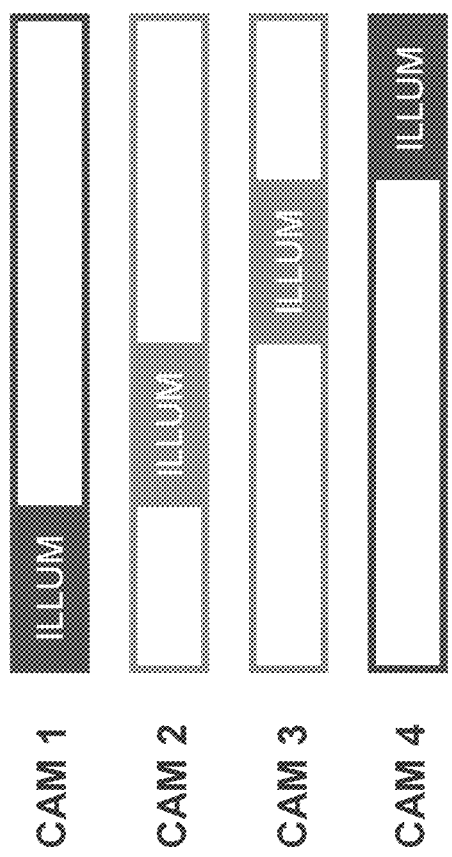
FIG. 14 is a schematic diagram illustrating an interference avoidance scheme in accordance with embodiments of the present disclosure.

In the Interference Handling Through Time Interleaving, policies for cameras can be implemented aimed at choosing a time slot for each camera in a way that their measurement periods did not overlap with the illumination patterns of other cameras to avoid incorrect time-of-flight estimates. Since the cameras are actively sensing the environment (using a photodiode for example) for ambient illumination from other cameras and "avoiding" those time slots in which such illumination exists, also referred to as "avoidance algorithm" for short. FIG. 14 illustrates this idea. Note that the illumination period for each camera is shown as a single pulse bundle in this figure, however the same idea can be applied when there are multiple bundles that a camera uses (see FIGS. 6A-6D above). For simplicity of illustration, this disclosure will continue the discussion with a single pulse bundle in the sequel.

Figure 15:
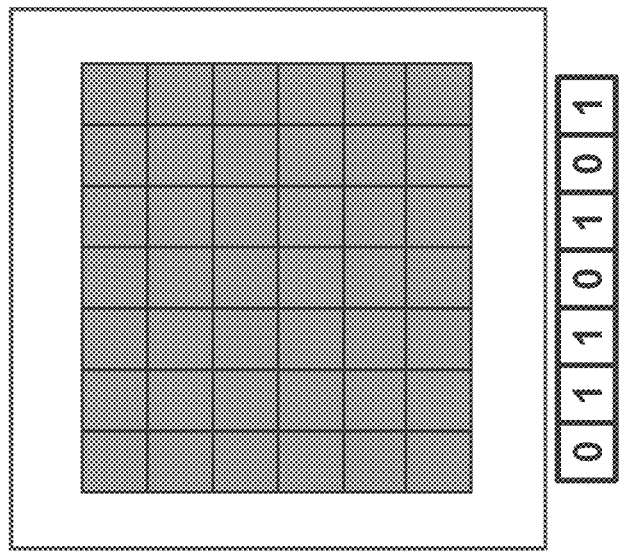
FIG. 15 is a schematic diagram illustrating an interference cancellation scheme in accordance with embodiments of the present disclosure.

In the Interference Handling Through Complementary Shutter Sequences technique described herein, the camera used a first subset of its pixels to measure the illumination stemming from both itself and the interfering cameras while using a second subset of its pixels to measure the illumination stemming from only the interferers. If each camera measured the illumination according to a carefully chosen random sequence in its first subset of pixels, and measured the illumination according to the logical complement of that random sequence in its second subset of pixels, then the latter measurement can be representative of the interference that contaminated the measurement of the first subset of pixels and can be subtracted to obtain a representative of a clean measurement. The results will improve if the subtracted measurements taken by a pixel(s) in the second subset is in close proximity to the pixel(s) in the first subset. This disclosure describes an example where the first subset consisted of pixels in the even rows whereas the second subset consisted of those in the odd rows. FIG. 15 summarizes the interference cancellation technique. Since the cameras actively measure the interference and try to subtract or "cancel" it, this technique can be referred to as the "cancellation algorithm" for short.

Figure 16:
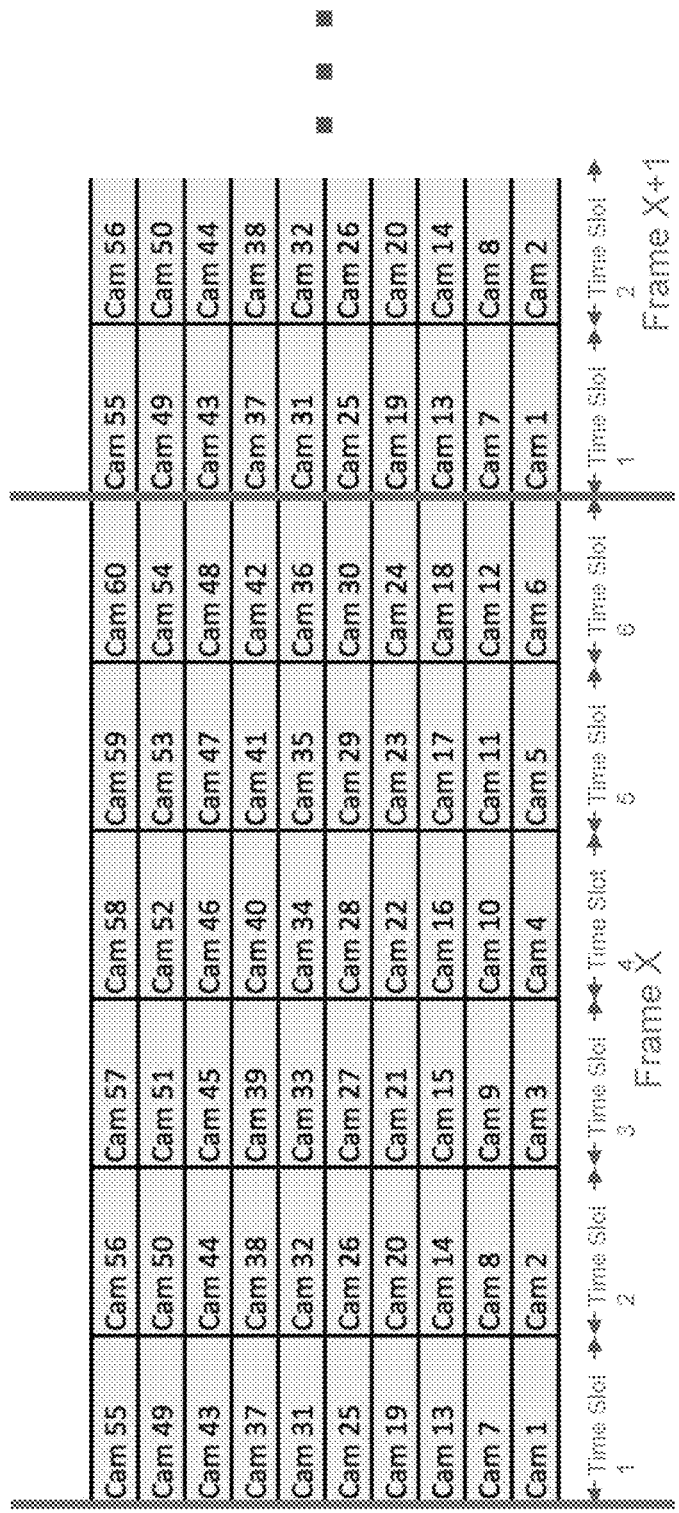
FIG. 16 is a schematic diagram illustrating the multiplicative effect of combining interference cancellation schemes in accordance with embodiments of the present disclosure.
Figure 18A:
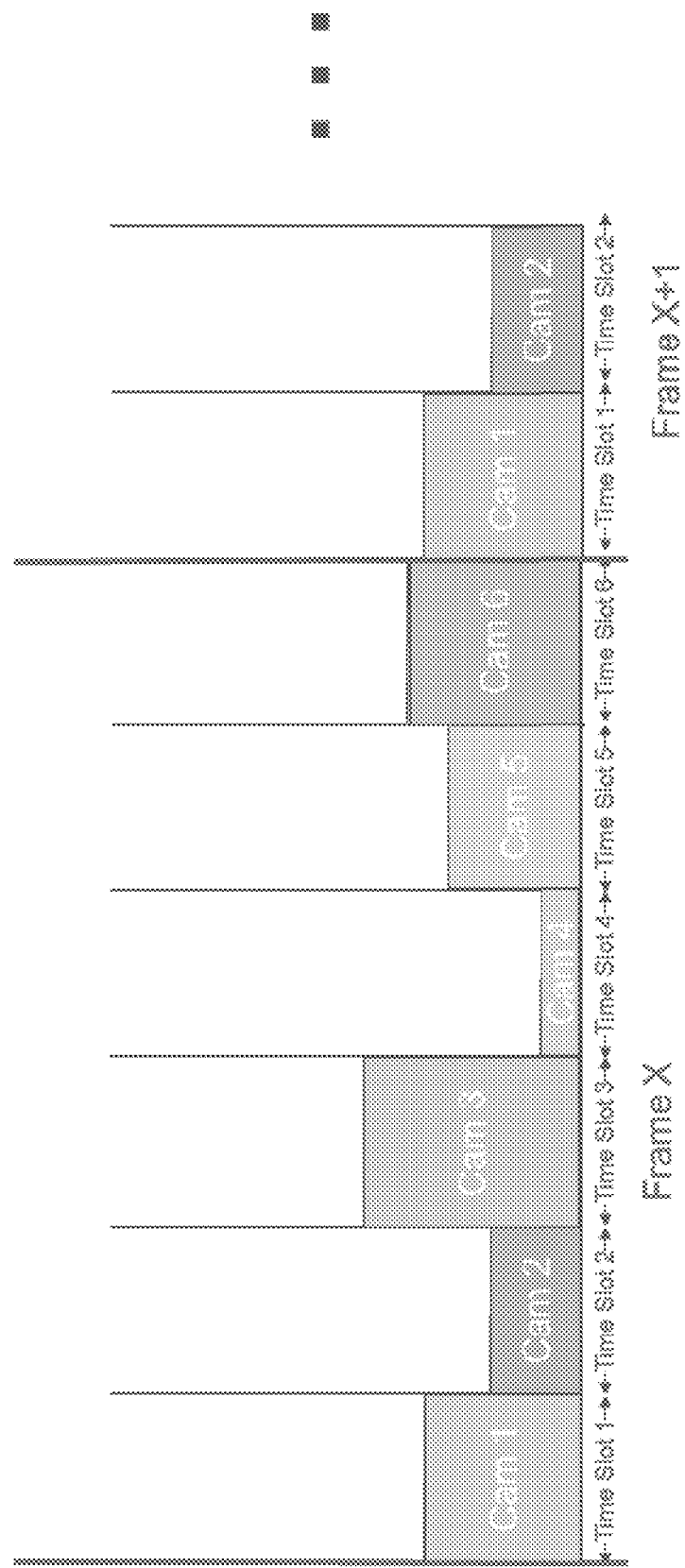
FIG. 18A-C are schematic diagrams illustrating the addition of cameras to a camera system in accordance with embodiments of the present disclosure.

In embodiments, a number M cameras can be used in the avoidance algorithm because illumination bundles from a larger number of cameras do not always fit in the span of one frame. In addition, a number N cameras can operate simultaneously in the same time slot under the interference cancellation algorithm. Therefore, in order to achieve a larger set of cameras (such as M×N) working together with a desirable level of interference handling, this disclosure describes combining these two approaches in a way that the number of cameras that can be handled is a multiplication of the numbers that individual algorithms can handle. For example, if there are 6 non-overlapping time slots in one frame, then each slot can be used to accommodate 10 cameras utilizing the cancellation algorithm, which is shown to be adequate for this many cameras. This gives rise to the possibility of operating 60+ cameras simultaneously with cancellable interference. FIG. 16 illustrates the multiplicative effect of combining the two interference handling algorithms. Note that the height of each cell does not necessarily represent the laser power for that camera, it is merely a representation of an exemplary time slot allocation for each camera. (FIG. 18A shows cameras with different power levels assigned to different time slots.)

Summary of an example algorithm that will achieve the proposed time allocation:

Before starting the laser of a new camera entering the scene, record the ambient light measurement from the photodiode (PD) or similar light sensitive device for the duration of few frames.

Threshold these measurements: Values below the threshold "Th" should be set to 0, and above the threshold "Th" should remain the same.

Take the derivative (first order difference) of the thresholded PD waveform and apply a threshold to detect the edges of times slots the current cameras are operating in (see those time slots in FIG. 16).

Figure 17:
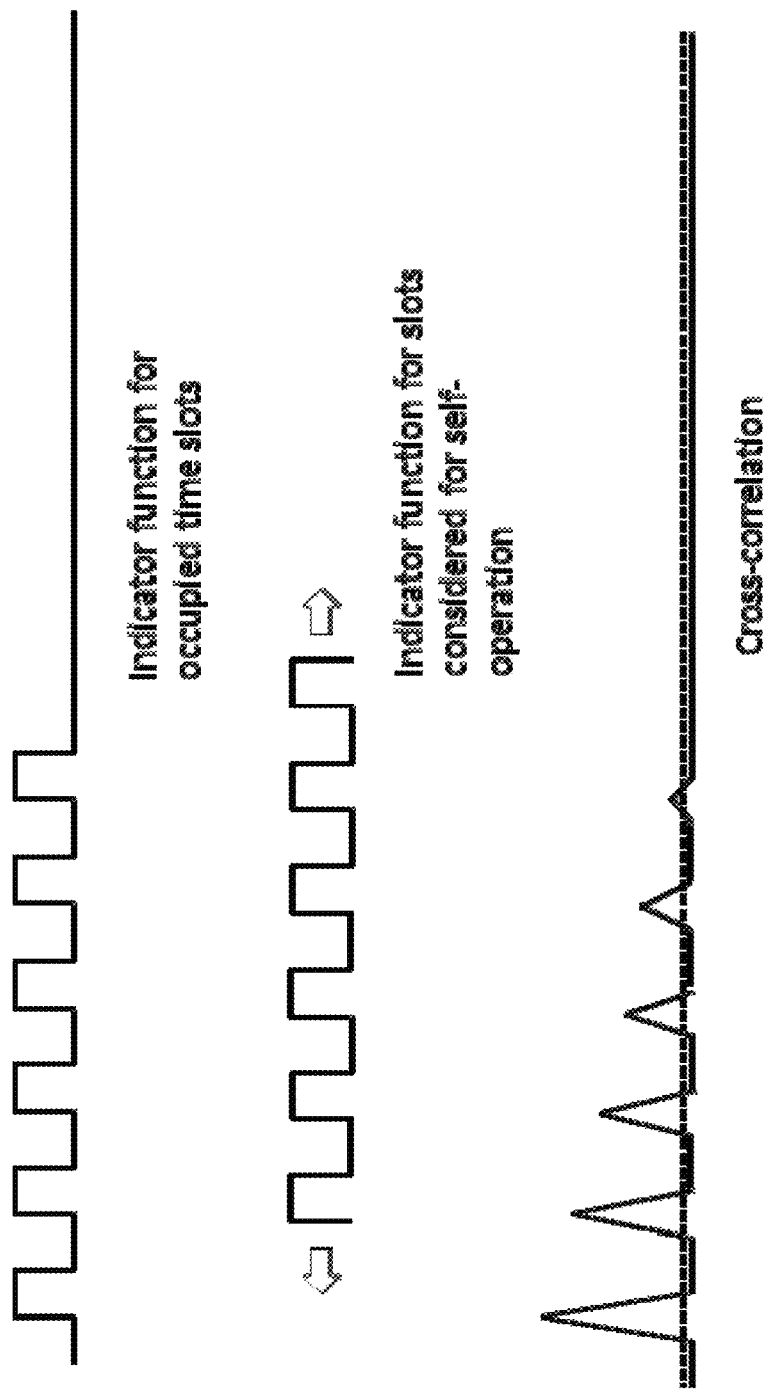
FIG. 17 is a schematic diagram illustrating cross correlation.

Perform a cross-correlation of the thresholded photodiode (PD) waveform with the indicator function of the self-operation pattern. (Indicator function has a value of 1 whenever the cameras "want to emit light or take a measurement such as S0, S1 or BG", and a value of 0 at all other times). The value of cross-correlation at each time instance represents the amount of interference that particular camera will experience if it decided to settle down in that time slot. FIG. 17 illustrates an example cross correlation between time slots in accordance with embodiments of the present disclosure.

Choose the minimum value of the cross-correlation only computed at the edges of the detected time slots.

Assign the camera to operate in the time slot the edge of which resulted in the minimum value of the cross-correlation (starting from the end of the first few frames used for initial PD measurements). If there are multiple time slots that the same minimum value was obtained, use the first one for more efficient placement of cameras. (This may never happen if all the previous cameras followed the same policy).

Continue to record the PD measurements, threshold both PD waveform as well as its derivative (with possibly and likely different thresholds) as described in previous steps and run the cross-correlation to monitor the interference landscape at time slot edges. If a predetermined condition representative of an unacceptable level of interference occurs (such as a predetermined number of pixels are saturated in S0, S1 or BG in a particular camera), then the camera chooses another time slot in which the cross-correlation has the (first) minimum value. (If saturation persists, the algorithms may have reached their interference handling capability).

At least some of these operations will be done in real time and with minimum amount memory used, for example, by keeping only the value of the minimum cross-correlation value and the time slot it was recorded and updating it as time progresses. Note that this algorithm is very similar to the current interference avoidance algorithm. There are two important differences:

First, the thresholding of the PD output is done differently. Here in the combined algorithm, the value of the PD output is not set to 1 if it is above the threshold. Instead it is left unchanged to keep the exact value of the interference amount in that time slot.

Second, a minimum value of the cross-correlation between the thresholded PD output and the indicator function of the self-operation pattern is determined rather than searching for a time slot that will make the cross-correlation zero. The reason for this change is that there will be no empty time slots for the camera to choose from (which would have made the cross-correlation 0) when there are more cameras than the number of available time slots, instead a new camera entering the scene will try to fit itself in the minimum interference time slot corresponding to one of the time slot edges.

Figure 18B:
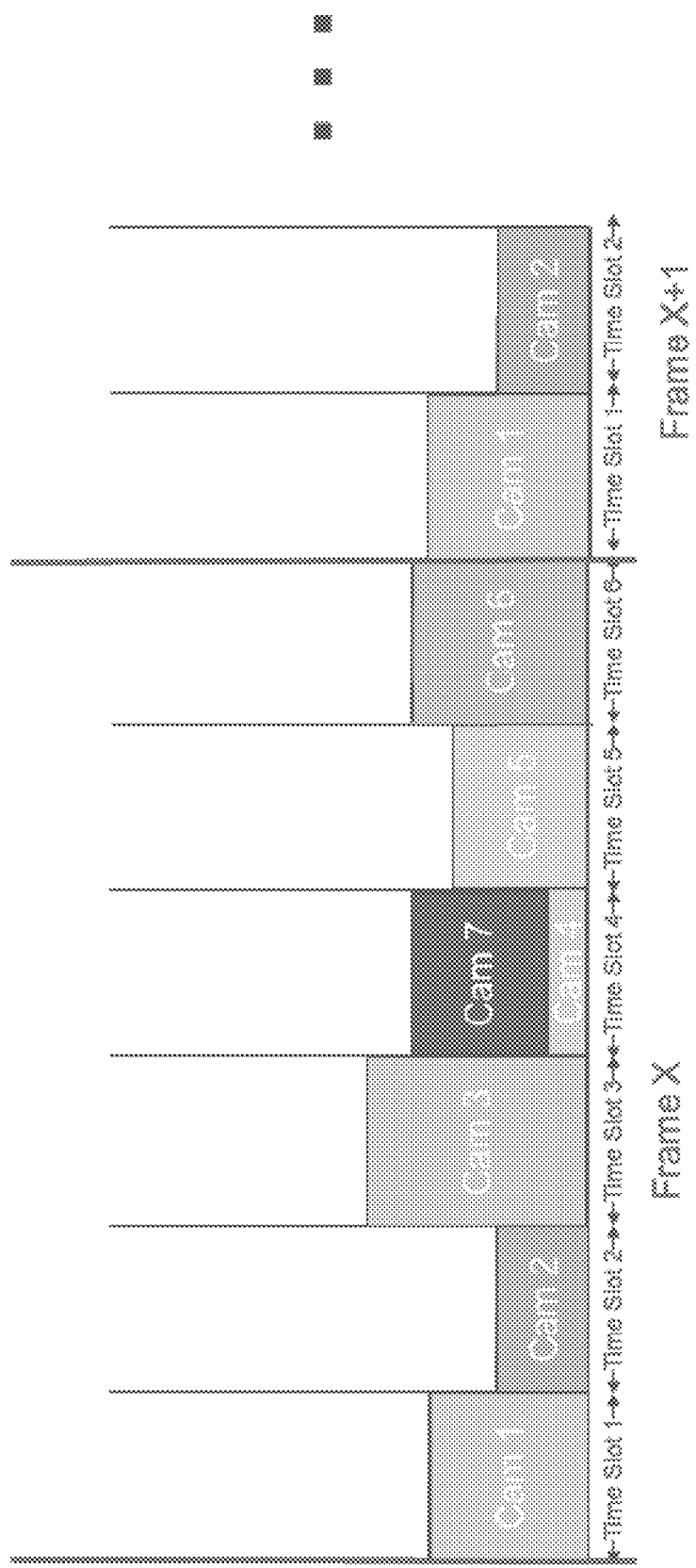
Figure 18C:
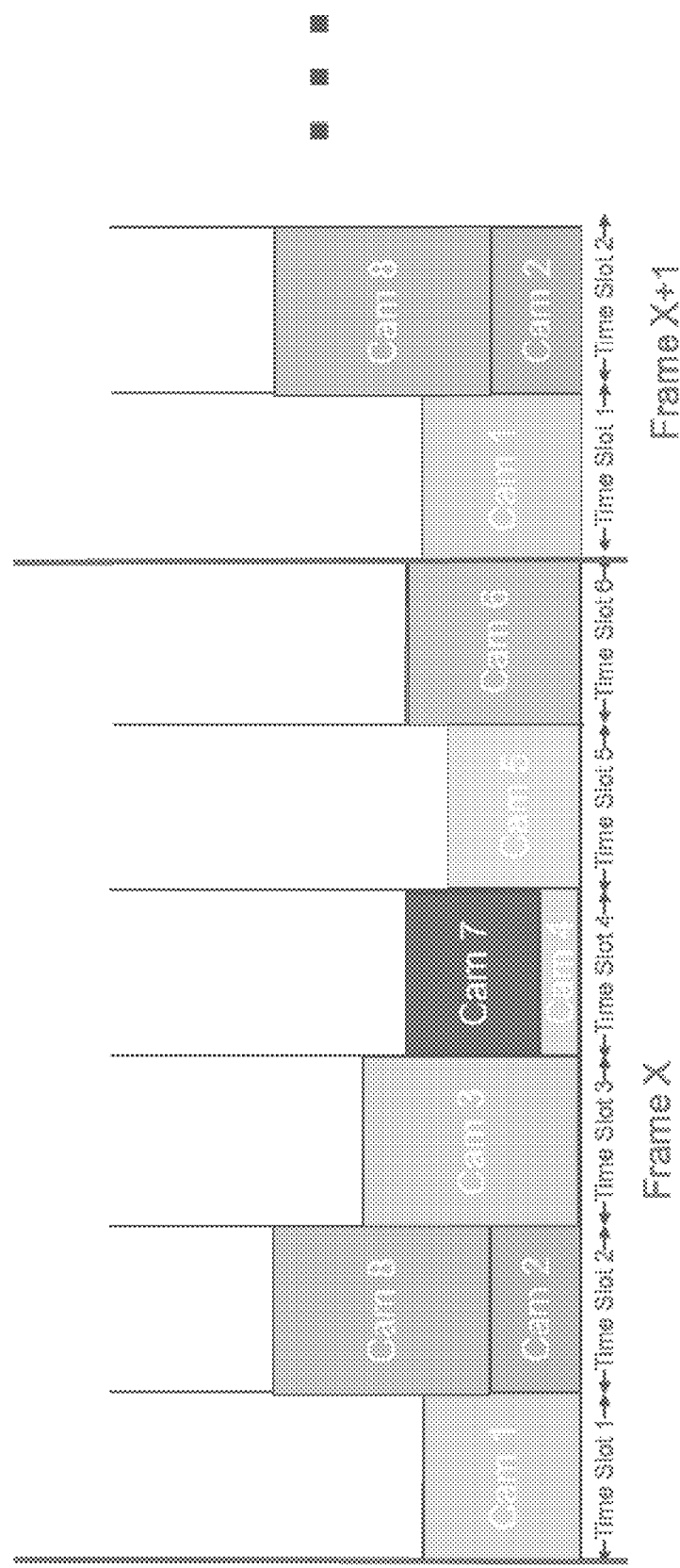

FIGS. 18A-C illustrates an example illumination landscape from the perspective of a new camera as it enters the scene. In FIG. 18A, each time slot is occupied by a camera (cameras 1-6). In FIG. 18B, a new camera, camera 7, will choose the minimum interference time slot to operate, which will be Time Slot 4 in this case. It is possible that once the new camera, camera 7, inserts itself into the landscape, another camera sharing the same time slot with it may find the interference in that particular slot has reached a level that cannot be handled by the cancellation algorithm and may choose to relocate itself to a new time slot. This is why each camera keeps monitoring the landscape even after settling down. In order to avoid the unstable behavior of constantly changing its time slot location, a minimum wait time (in terms of frames or seconds) can be imposed before a camera can change its time slot after settling down in that time slot and/or after it detects that the interference level at its time slot has increased to an unacceptable level by the introduction of a new camera. In FIG. 18C, new camera 8 identifies time slot 2 as an available time slot, into which camera 8 is assigned.

There are other algorithms that can be adopted instead of Algorithm 1. For example, instead of choosing the minimum interference slot, new cameras may fill in the time slots in increasing order (Slot 1→Slot 2→Slot 3→ . . . Slot 6→Slot 1→Slot 2 . . . ) regardless of the interference level at each slot. This may reduce computation of determining where to insert a camera and rely more heavily on the capabilities of the interference cancellation algorithm itself because the level of interference is not distributed evenly into the available time slots as Algorithm 1 tends to do. Another algorithm is to fill in a time slot until a new camera gets saturated if it also enters the same time slot, effectively filling up the capacity of that time slot and then moving onto the next time slot. In this scheme, for example the first 10 cameras fill up slot 1 and then the 11$^{th}$ camera sees that it saturates if it also enters the same time slot, so it moves on to time slot 2, and the 12$^{th}$ camera also joins time slot 2, etc.

Figure 19:
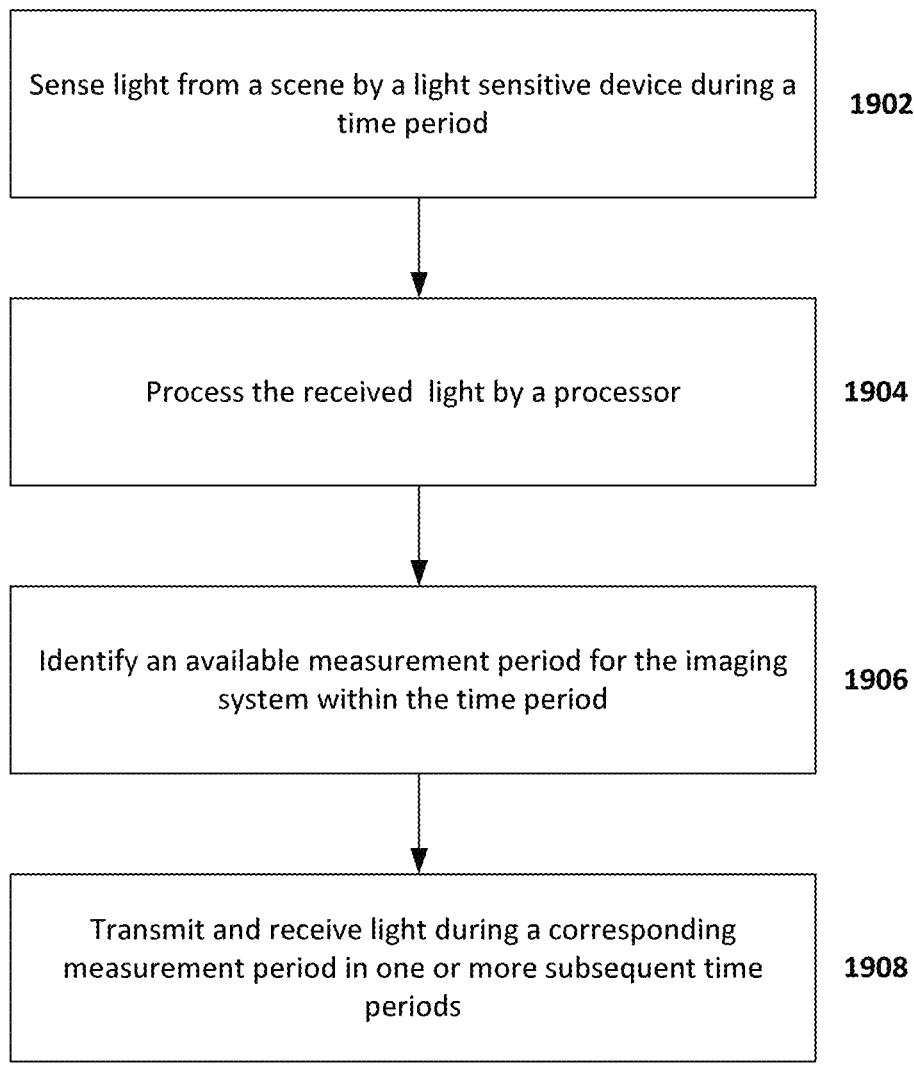
FIG. 19 is a process flow diagram for performing interference avoidance in accordance with embodiments of the present disclosure.

FIG. 19 is a process flow diagram 1900 for interference avoidance in accordance with embodiments of the present disclosure. The method can be implemented by an imaging system, such as a device that includes a camera. The process can include sensing, by an light sensor of the imaging system, light received during a time period (1902). The imaging system can process the light received by the light sensor (e.g., by a control logic implemented at least partially in hardware) (1904). Processing the light received can include creating a time series waveform representative of the light received within the time period.

In some embodiments, the imaging system can process the time series waveform. The imaging system can identify time instances from the processed time series waveform corresponding to the reception of light emitted by a source of interference and determine a set of time slots based on the time instances. In embodiments, processing the time series waveform comprises obtaining a magnitude and a time instance representative of a rising edge or falling edge of the time series waveform.

The imaging system can identify an available measurement period for the imaging system within the time period based on the processed light (1906). The imaging system can identify an available measurement period by correlating the time series waveform with a time window to create a correlation waveform. The imaging system can identify a period during which the correlation waveform indicates a lowest level of interference. In embodiments, the imaging system can identify a period during which the correlation waveform indicates a level of interference below a threshold level of interference. In some embodiments, the imaging system can include identifying a first period during which the correlation waveform indicates an interference level below a threshold level of interference, the first period occurring immediately after a period during which the correlation waveform indicates an interference level above the threshold level.

In embodiments, the imaging system can identify an available measurement period for the imaging system by identifying an available time slot from among a set of time slots within the time period for the imaging system to use for transmitting light pulses. The imaging system can identify an available time slot from among the set of time slots by identifying an occupied time slot and identifying a subsequent time slot to the occupied time slot that is unoccupied.

In embodiments, the imaging system can determine the set of time slots by identifying a time instance from the obtained magnitude and time instance representative of a rising edge from the time series waveform corresponds to a beginning of an occupied time slot. The imaging system can determine the set of time slots based on the determination that the time instance corresponds to the beginning of the occupied time slot. The imaging system can identify a time instance from the obtained magnitude and time instance by identifying a guard time interval greater than or equal to a known guard period in the time series waveform during which the time series waveform indicates received interference below a first threshold level and by identifying a time instance corresponding to a magnitude representative of a rising edge in the time series waveform greater than the first threshold level and adjacent in time to the identified guard time interval.

The imaging system can also determine that a magnitude representative of rising edges or falling edges comprises a value greater than a second threshold value and is present in the time series waveform within an interval substantially equal to a known time slot length and adjacent in time to the identified guard time interval.

In embodiments, processing the time series waveform includes obtaining a magnitude and a time instance representative of a rising edge or falling edge of the time series waveform. The imaging system can identify an available time slot by identifying a time slot that exhibits a magnitude value below a threshold value for each time instance within the identified time slot.

In embodiments, the imaging system can identify an available time slot by accumulating values of the time series waveform in each time slot; and identifying a time slot that exhibits a lowest accumulated value among the time slots.

In embodiments, the imaging system can identify a guard period adjacent a time slot; determine a presence of signal interference in the guard period above a third threshold value; and determine another available time slot within the frame.

The imaging system can transmit and receive light during a corresponding measurement period in one or more subsequent time periods (1908).

Figure 20:
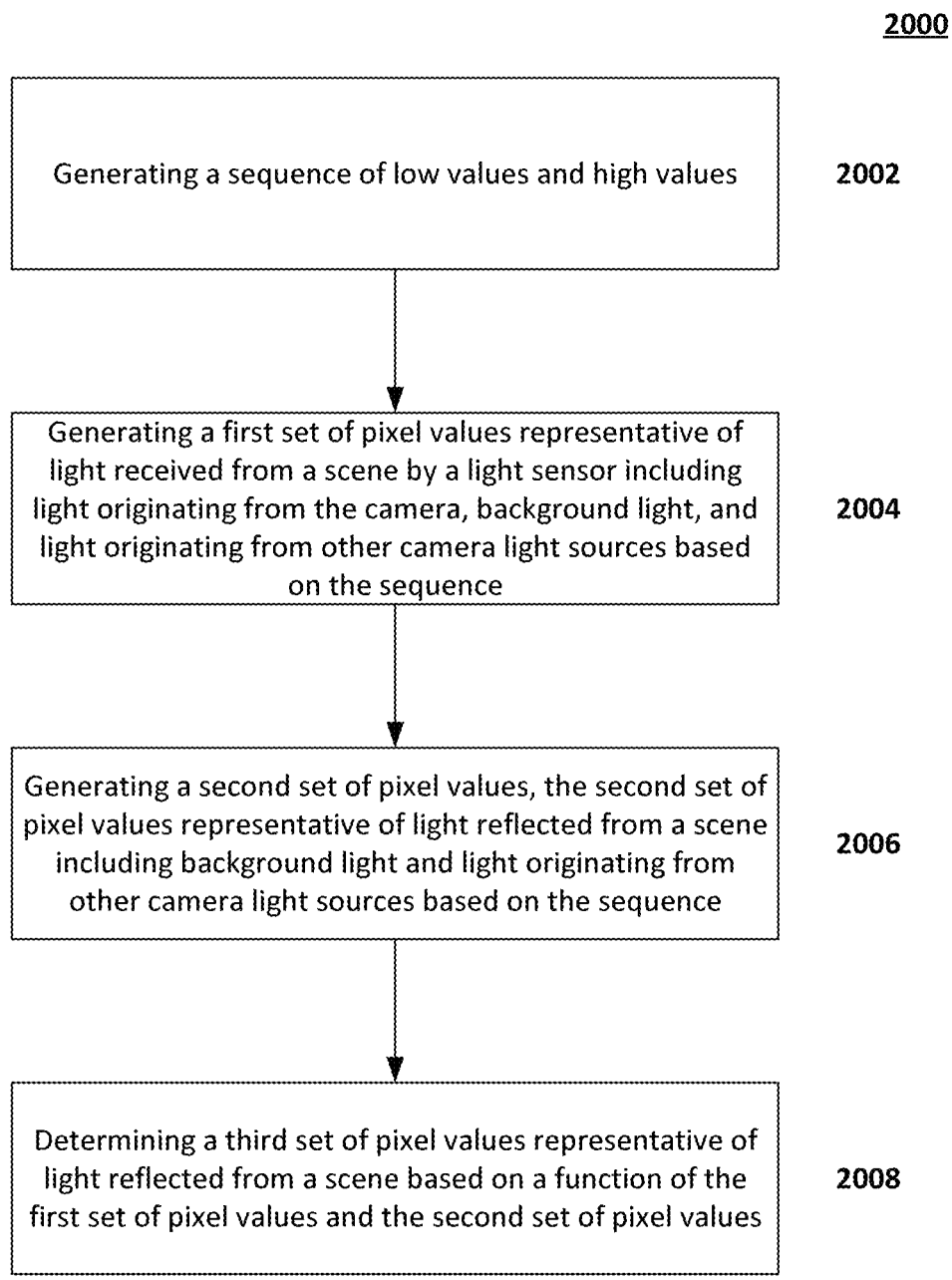
FIG. 20 is a process flow diagram for performing interference cancellation in accordance with embodiments of the present disclosure.

FIG. 20 is a process flow diagram 2000 for performing interference cancellation in accordance with embodiments of the present disclosure. An imaging system, such as a camera system that includes a processor or other control logic can generate or be programmed with, a sequence (2002). The sequence can include a plurality of high values and plurality of low values and can include a sequence length. In some embodiments, generating the sequence can include selecting a template sequence length that is smaller than the sequence length, generating a template sequence comprising a length equal to the selected template sequence length, and generating the sequence having the sequence length by repeating the template sequence.

In some embodiments, generating the template sequence can include generating a sub-sequence having a length that is half of the template sequence length; generating a complementary sub-sequence to the sub-sequence that is half of the template sequence length; and generating the template sequence by concatenating the sub-sequence and the complementary sub-sequence. The sub-sequence comprises a sequence of equal values.

In some embodiments, generating the sequence can include generating a pseudo-random sequence. The pseudo-random sequence can include at least part of a Gold sequence or other the of sequence.

The imaging system can generate a first set of pixel values, the first set of pixel values representative of light received from a scene by a light sensor including light originating from the camera, background light, and light originating from other camera light sources (2004). For example, generating the first set of pixel values can include activating a light source and a shutter based on a high value of the sequence.

In some embodiments, generating the first set of pixel values can include measuring a first subset of pixel values using the image sensor that are representative of light reflected from a scene including light originating from the camera system, background light, and light originating from other camera light sources. The imaging system can generate a second subset of pixel values by interpolating the first subset of pixel values; and generate the first set of pixels based on the first subset of pixel values and the second subset of pixel values.

The imaging system can generate a second set of pixel values, the second set of pixel values representative of light reflected from a scene including background light and light originating from other camera light sources (2006). For example, generating the second set of pixel values can include activating a shutter based on a low value of the sequence.

The imaging system can determine a third set of pixel values representative of light reflected from a scene based on a function of the first set of pixel values and the second set of pixel values (2008).

In embodiments, generating the second set of pixel values can include measuring a third subset of pixel values using the image sensor that are representative of light reflected from a scene including background light, and light originating from other camera light sources; generating a fourth subset of pixel values by interpolating the third subset of pixel values; and generating the second set of pixels based on the third subset of pixel values and the fourth subset of pixel values.

In embodiments, generating the third set of pixel values can include subtracting the second set of pixel values from the first set of pixel value.

In some embodiments, the first subset comprises pixel values representative of pixels from even rows of the light sensor; the fourth subset comprises pixel values based on interpolated pixel values from the even rows of the light sensor; the third subset comprises pixel values representative of pixels from odd rows of the light sensor; and the second subset comprises pixel values based on interpolated pixel values from the odd rows of the light sensor.

What is claimed is:

1. A method for handling interference in an imaging system, the method comprising:
    receiving, at a light detection circuit of the imaging system, light during a first time period;
    sampling, at the light detection circuit, the received light at a first sampling rate and producing an output;
    identifying an available measurement period for the imaging system within the time period based on the output;
    determining a shutter rate for a light sensor based on the available measurement period;
    emitting a light from a light source during a corresponding measurement period in a subsequent time period; and
    sensing light at the light sensor during the corresponding measurement period.

2. The method of claim 1, further comprising creating a time series waveform representative of the light received within the first time period.

3. The method of claim 2, wherein identifying the available measurement period comprises:
    correlating the time series waveform with a time window to create a correlation waveform.

4. The method of claim 3, wherein identifying the available measurement period comprises:
    identifying a period during which the correlation waveform indicates a lowest level of interference.

5. The method of claim 3, wherein identifying the available measurement period comprises:
    identifying a period during which the correlation waveform indicates a level of interference below a threshold level of interference.

6. The method of claim 3, wherein identifying the available measurement period comprises:
    identifying a first available period during which the correlation waveform indicates an interference level below a threshold level of interference, the first available period occurring immediately after a first unavailable period during which the correlation waveform indicates an interference level above the threshold level.

7. The method of claim 1, wherein identifying the available measurement period for the imaging system comprises identifying an available time slot from among a set of time slots within the first time period for the imaging system to use for transmitting light pulses.

8. The method of claim 7, wherein identifying the available time slot comprises identifying an occupied time slot and identifying a subsequent unoccupied time slot.

9. The method of claim 2, further comprising:
processing the time series waveform;
identifying time instances from the processed time series waveform corresponding to the reception of light emitted by a source of interference; and
determining a set of time slots based on the time instances.

10. The method of claim 9, wherein processing the time series waveform comprises obtaining a magnitude and a first time instance representative of one of a rising edge and a falling edge of the time series waveform.

11. The method of claim 9, wherein determining a first time slot of the set of time slots comprises identifying a first time instance representative of a rising edge from the time series waveform, wherein the rising edge corresponds to a beginning of an occupied time slot, wherein the first time instance is a beginning of the first time slot.

12. The method of claim 2, wherein processing the time series waveform comprises obtaining a magnitude and a time instance representative of a rising edge or falling edge of the time series waveform.

13. The method of claim 1, wherein identifying an available measurement period comprises identifying a time slot that exhibits a magnitude value below a threshold value for each time instance within the identified time slot.

14. The method of claim 2, wherein identifying an available measurement period comprises:
accumulating values of the time series waveform in each of a plurality of time slots; and
identifying a first time slot that exhibits a lowest accumulated value among the plurality of time slots.

15. The method of claim 1, further comprising:
identifying a guard period adjacent a time slot;
determining a presence of signal interference in the guard period above a third threshold value; and
determining another available time slot within the frame.

16. A camera apparatus for handling interference comprising:
a light source configured to emit light;
a light sensor configured to receive reflected emitted light at a shutter rate;
a timing generator configured to control the light source and the shutter rate;
a light detection circuit different from the light sensor configured to receive ambient light during a first time period, sample the received ambient light at a sampling rate, and output a signal representative of the sampled ambient light; and
control logic to:
identify an available measurement period within the first time period based on the output; and
update the timing generator to cause the light source to emit light and the light sensor to sense emitted light during a corresponding measurement period in a subsequent time period.

17. The camera apparatus of claim 16, wherein the control logic is configured to create a time series waveform representative of the light received within the first time period.

18. The camera apparatus of claim 17, wherein the control logic is configured to identify the available measurement period by correlating the time series waveform with a time window to create a correlation waveform.

19. The camera apparatus of claim 18, wherein the control logic is configured to identify the available measurement period by identifying a period during which the correlation waveform indicates a level of interference below a threshold level of interference.

20. The camera apparatus of claim 18, wherein the control logic is configured to identify the available measurement period by identifying a first available period during which the correlation waveform indicates an interference level below a threshold level of interference, the first available period occurring immediately after a first unavailable period during which the correlation waveform indicates an interference level above the threshold level.

21. The camera apparatus of claim 16, wherein the control logic is configured to identify the available measurement period by identifying an available time slot from among a set of time slots within the first time period for the imaging system to use for transmitting light pulses.

22. The camera apparatus of claim 21, wherein identifying the available time slot comprises identifying an occupied time slot and identifying a subsequent unoccupied time slot to the occupied time slot.

23. The camera apparatus of claim 17, wherein the control logic is further configured to:
process the time series waveform;
identify time instances from the processed time series waveform corresponding to the reception of light emitted by a source of interference; and
determine a set of time slots based on the time instances.

24. The camera apparatus of claim 23, wherein the control logic is further configured to process the time series waveform by obtaining a magnitude and a first time instance representative one of a rising edge and a falling edge of the time series waveform.

25. The camera apparatus of claim 23, wherein the control logic is configured to determine a first time slot of the set of time slots by:
identifying a first time instance representative of a rising edge from the time series waveform, wherein the rising edge corresponds to a beginning of an occupied time slot wherein the first time instance is the beginning of the first time slot.

26. The camera apparatus of claim 17, wherein the control logic is further configured to process the time series waveform by obtaining a magnitude and a time instance representative of a rising edge or falling edge of the time series waveform.

27. The method of claim 1, wherein the sampling rate is different from the shutter rate.

28. The method of claim 1, wherein sensing light at the light sensor occurs subsequent to determining an available measurement period.

29. The apparatus of claim 16, wherein the sampling rate is different from the shutter rate.

30. The apparatus of claim 16, further comprising a shutter configured to block light from the light sensor, wherein the shutter is closed until the control logic identifies the available measurement period and updates the timing generator.

31. An imaging system for handling interference among multiple depth-sensing cameras, comprising:
- a light source configured to emit light;
- a light sensor configured to receive emitted light at a shutter rate;
- a timing generator configured to control the light source and the shutter rate;
- a light detection circuit configured to receive ambient light during a first time period, sample the received ambient light at a sampling rate, and output a signal representative of the sampled light; and
- control logic configured to:
    - identify a first available measurement period within the first time period based on the output; and
    - update the timing generator to cause the light source to emit light during a corresponding second available measurement period in a second time period, and to set the shutter rate such that the light sensor receives emitted light during the second available measurement period.

32. The imaging system of claim 31, wherein the control logic is configured to create a time series waveform representative of the light received in the first time period.

\* \* \* \* \*